(12) United States Patent
Omura

(10) Patent No.: US 11,653,639 B2
(45) Date of Patent: May 23, 2023

(54) FISHING LINE GUIDE, FISHING ROD INCLUDING FISHING LINE GUIDE, AND BLANK FOR FISHING LINE GUIDE

(71) Applicant: FUJI KOGYO CO., LTD., Shizuoka (JP)

(72) Inventor: Kazuhito Omura, Shizuoka (JP)

(73) Assignee: FUJI KOGYO CO., LTD., Shizuoka (JP)

( * ) Notice: Subject to any disclaimer, the term of this patent is extended or adjusted under 35 U.S.C. 154(b) by 688 days.

(21) Appl. No.: 16/509,529

(22) Filed: Jul. 12, 2019

(65) Prior Publication Data
US 2020/0068862 A1 Mar. 5, 2020

(30) Foreign Application Priority Data

Sep. 5, 2018 (KR) .................. 10-2018-0106092
Jan. 22, 2019 (KR) .................. 10-2019-0008241

(51) Int. Cl.
*A01K 87/04* (2006.01)
*A01K 89/00* (2006.01)
*A01K 87/00* (2006.01)

(52) U.S. Cl.
CPC ............ *A01K 87/04* (2013.01); *A01K 87/002* (2013.01); *A01K 89/00* (2013.01)

(58) Field of Classification Search
CPC .................................................... A01K 87/04
(Continued)

(56) References Cited

U.S. PATENT DOCUMENTS 2,502,846 A * 4/1950 Hoffman ................. A01K 87/04
D22/143
4,141,132 A * 2/1979 Ohmura .................. B23P 11/00
29/432

(Continued)

FOREIGN PATENT DOCUMENTS

CN 301295226 S 7/2010
CN 101933498 A 1/2011
(Continued)

OTHER PUBLICATIONS

Combined Chinese Office Action and Search Report dated Apr. 14, 2021 in Patent Application No. 201910812588.3 (with English language translation), citing documents AO and AP therein, 19 pages.

*Primary Examiner* — Darren W Ark
(74) *Attorney, Agent, or Firm* — Oblon, McClelland, Maier & Neustadt, L.L.P.

(57) ABSTRACT

A fishing line guide guiding a fishing line is attached to a rod body of a fishing rod. The fishing line guide includes a ring holding portion and a first support leg portion extending from the ring holding portion. The ring holding portion includes an inner peripheral portion, an outer peripheral portion, and an annular portion extending in a circumferential direction between the inner and outer peripheral portions. The ring holding portion is coupled to a guide ring at the inner peripheral portion. The first support leg portion has a pair of lateral surfaces connecting with the outer peripheral portion. The ring holding portion includes a pair of twisted portions which form a portion of the outer peripheral portion and a portion of the annular portion and are twisted respectively from the annular portion toward the lateral surfaces of the first support leg portion to the outer peripheral portion.

9 Claims, 30 Drawing Sheets

(58) Field of Classification Search
USPC .................................................. 43/24
See application file for complete search history.

(56) References Cited

U.S. PATENT DOCUMENTS

| | | | | |
|---|---|---|---|---|
| 4,215,504 | A * | 8/1980 | Ohmura | A01K 87/04 D22/143 |
| 5,870,848 | A * | 2/1999 | Ohmura | A01K 87/04 43/24 |
| 6,378,240 | B1 * | 4/2002 | Ohmura | A01K 87/04 43/24 |
| D534,616 | S * | 1/2007 | Omura | D22/143 |
| 9,510,574 | B2 * | 12/2016 | Omura | A01K 87/04 |
| 10,561,129 | B2 * | 2/2020 | Omura | A01K 87/04 |
| 2005/0172535 | A1 * | 8/2005 | Lee | A01K 87/04 43/24 |
| 2006/0283073 | A1 * | 12/2006 | Omura | A01K 87/04 43/24 |
| 2009/0165355 | A1 * | 7/2009 | Jeong | A01K 87/04 242/157 R |
| 2009/0282724 | A1 * | 11/2009 | Omura | A01K 87/04 43/24 |
| 2016/0183506 | A1 * | 6/2016 | Omura | A01K 87/04 43/24 |
| 2018/0168137 | A1 * | 6/2018 | Omura | A01K 87/04 |
| 2020/0037589 | A1 * | 2/2020 | Omura | A01K 87/04 |

FOREIGN PATENT DOCUMENTS

| | | | | |
|---|---|---|---|---|
| CN | 103039413 | A | | 4/2013 |
| FR | 58249 | E | * | 9/1953 |
| GB | 2314248 | A | * | 12/1997 ............ A01K 87/04 |
| JP | 6-343373 | | | 12/1994 |
| JP | 11-225628 | | | 8/1999 |
| JP | 3072313 | | | 7/2000 |
| JP | 2000-253778 | A | | 9/2000 |
| JP | 2004-24080 | | | 1/2004 |
| JP | 2004-89055 | | | 3/2004 |
| JP | 2006-25714 | A | | 2/2006 |
| JP | 2007-215497 | A | | 8/2007 |
| JP | 2016-73325 | A | | 5/2016 |
| JP | 6364554 | | | 7/2018 |
| KR | 20040031322 | A | * | 4/2004 |
| KR | 10-1466539 | | | 11/2014 |

* cited by examiner

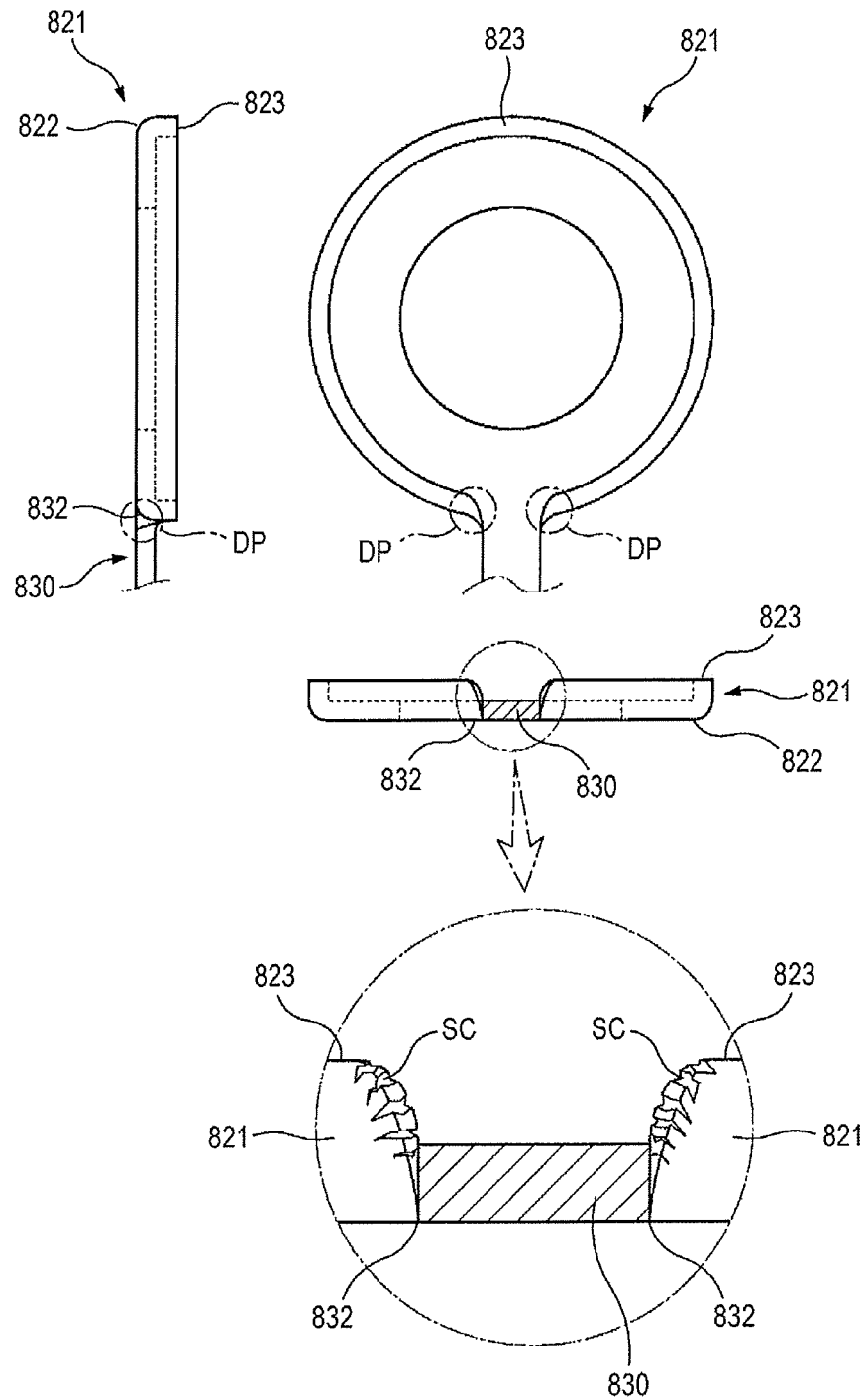

Embodiment                Comparative Example

Proof Stress Measurement                                    Unit : N

|  |  | Test Example 1 | Test Example 2 | Test Example 3 | Test Example 4 | Test Example 5 | Test Example 6 |
|---|---|---|---|---|---|---|---|
| Forward Load | Embodiment | 45.35 | 53.85 | 41.78 | 43.87 | 33.77 | 39.42 |
|  | Comparative Example | 39.27 | 54.52 | 35.14 | 37.32 | 32.80 | 33.04 |
| Rearward Load | Embodiment | 33.36 | 40.92 | 25.16 | 23.46 | 21.99 | 33.20 |
|  | Comparative Example | 30.88 | 33.83 | 21.91 | 21.77 | 18.83 | 29.31 |

FISHING LINE GUIDE, FISHING ROD INCLUDING FISHING LINE GUIDE, AND BLANK FOR FISHING LINE GUIDE

CROSS-REFERENCE TO RELATED APPLICATION

This application is based upon and claims the benefit of priorities from Korean Patent Application No. 10-2018-0106092, filed on Sep. 5, 2018 and Korean Patent Application No. 10-2019-0008241, filed on Jan. 22, 2019, the entire contents of each of which are incorporated herein by reference.

TECHNICAL FIELD

The present disclosure relates to a fishing line guide which is attached to a fishing rod and guides a fishing line, and a fishing rod including a fishing line guide. Further, the present disclosure relates to a blank which is worked into a fishing line guide.

BACKGROUND

A fishing line guide which guides a fishing line in a fishing rod has a guide ring through which the fishing line passes, and a frame which is fixed to the fishing rod by means of a winding thread and holds the guide ring.

The guide ring is formed from a hard material such as ceramic. The frame is formed by press-working (e.g., bending, drawing) a metallic sheet material which is made from a metallic material such as stainless steel, titanium or brass. For example, the frame is formed by press-working such that it integrally has a ring holding portion holding the guide ring, an attachment foot fixed to the fishing rod by means of a winding thread, and a support leg supporting the ring holding portion. The fishing line guide may be made by fitting the guide ring to the ring holding portion and fixing the guide ring to the ring holding portion with an adhesive.

Several fishing line guides are attached to a single fishing rod. For example, in case of the fishing rod having an overall length of about 3 m, about ten fishing line guides may be attached to the fishing rod. Therefore, the weight ratio of the fishing line guides in the fishing rod increases, and the weight reduction in the fishing line guide is needed for the fishing rod. During fishing, the fishing line frequently covers the fishing line guide and may be tangled to the fishing line guide. To this end, the ring holding portion, which is frequently covered by the fishing line, may be formed to have a cylindrical shape through drawing working so that it does not damage the fishing line. The ring holding portion drawn into the cylindrical shape can prevent the guide ring from directly coming into contact with surrounding objects and breaking thereby.

As an example of a fishing line guide, Japanese Patent Application Publication No. 1999-225628 (Patent Document 1) discloses a fishing line guide having a ring holding portion which is drawn into a cylindrical shape. As another example of a fishing line guide, Japanese Registered Patent Publication No. 3072313 (Patent Document 2) discloses a fishing line guide in which a support leg portion is directly bent forward from a drawn ring holding portion.

A fishing line guide of a prior art is described below with reference to FIGS. 1 and 2. FIG. 1 shows a fishing line guide of a prior art similar to, for example, the fishing line guide disclosed by Patent Document 2. FIG. 2 is a rear view of the fishing line guide shown in FIG. 1. The fishing line guide 800 has a ring holding portion 820, which holds a guide ring 810 and has an annular shape, and a front support leg portion 830 which extends from the ring holding portion 820 and is bent forward with respect to the ring holding portion 820.

The front support leg portion 830 is bent forward with respect to an annular body 821 of the ring holding portion 820 at a joint end 831 at which the front support leg portion connects with the annular body 821. The front support leg portion 830 is bent forward with respect to the annular body 821 while a portion located between a front surface 822 of the annular body 821 and the joint end 831 becomes a bending-starting portion 832. Concave portions CP are formed respectively between a rear surface 823 of the annular body 821 and the bent front support leg portion 830 and between the front surface 822 of the annular body 821 and the bent front support leg portion 830. Further, the front support leg portion 830 is bent such that it does not protrude rearward from a plane extending through the rear surface 823 of the annular body 821. Since the front support leg portion 830 is directly bent from the annular body 821, a lower portion of the annular body 821 expands outward and deforms. Thus, a deformation portion DP is unavoidably formed between the joint end 831 of the front support leg portion 830 and the annular body 821. The deformation portion DP is subject to excessive elongation along with being bent of the front support leg portion 830, and therefore, cracks or breakage can be created in the deformation portion DP.

The bending-starting portion 832 shown in FIG. 1 is located rearward away from the front surface 822 of the annular body 821. In case of bending the support leg portion with respect to the ring holding portion, the bending-starting portion may be located in the middle of the annular body of the ring holding portion, or may be located in the vicinity of the front surface of the annular body of the ring holding portion. A fishing line can be easily caught by the concave portion CP. To make a depth of the concave portion CP shallow, the bending-starting portion at which the bending of the support leg portion starts is needed to move toward the front surface 822. However, the position of the bending-starting portion should be determined in view of the difficulty in working of bending the support leg portion.

Examples of a prior art where a blank is worked into the ring holding portion and the support leg portion is bent with respect to the ring holding portion are described with reference to FIGS. 3A to 3D. The blank has a shape formed by spreading the fishing line guide to a development figure and means a workpiece obtained from a metallic sheet material through blanking working.

FIG. 3A shows a portion of a blank which is used for manufacturing the fishing line guide of a prior art. Referring to FIG. 3A, the blank 900 of a prior art may have a disk-shaped portion 910 and a leg portion 920. The disk-shaped portion 910 has a substantially circular shape, and may be worked into the annular body 821 of the ring holding portion 820 shown in FIG. 1. The leg portion 920 extends from the disk-shaped portion 910 and may be worked into the front support leg portion 830 shown in FIG. 1.

FIG. 3B shows an example of working the disk-shaped portion of the blank into the annular body of the ring holding portion through drawing. The entire edge portions of the disk-shaped portion 910 shown in FIG. 3A is drawn into a cylindrical shape, thus forming the annular body 821 of the ring holding portion 820 shown in FIG. 1. The drawn annular body 821 has an annular front surface 822 which is located at a front side of the annular body 821, and an annular rear surface 823 which is located at a rear side of the annular body 821. The annular body 821 is formed by bending the entire edge of the disk-shaped portion 910 perpendicularly with respect to the disk-shaped portion 910. While the disk-shaped portion 910 is being worked into the annular body 821, the leg portion 920 is moved together with the bent edge portion of the disk-shaped portion 910 so as to be perpendicular with respect to the disk-shaped portion 910. That is, if the disk-shaped portion 910 is drawn into a cylindrical shape, then the leg portion 920 protrudes from the rear surface 823 of the annular body 321 and is located perpendicularly with respect to the annular body 821, as shown in FIG. 3B.

FIG. 3C shows an example where the support leg portion is worked from the drawn annular body through bending. Referring to FIG. 3C, the support leg portion 830 is bent from the perpendicular orientation shown in FIG. 3B to the horizontal orientation shown in FIG. 3A. Further, the support leg portion 830 is bent such that a concave portion does not exist between the front surface 822 of the annular body 821 and the support leg portion 830. As shown in FIGS. 3B and 3C, to exclude the concave portion, a corner portion between the front surface 822 of the annular body 821 and the leg portion 920 may become a portion where bending of the leg portion 920 starts. That is, the bending-starting portion 832 can be set as the corner portion between the front surface 822 of the annular body 821 and the leg portion 920. In such a case, when the bending-working is conducted on the leg portion 920, a portion, which includes the following: a lower portion of the annular body 821; a lower portion of the rear surface 823; and the bending-starting portion 832 (i.e., a portion indicated by reference symbol BP in FIG. 3B), is bent downward and outward and deforms, thus forming a rounded deformation portion DP between the annular body 821 and the support leg portion 830. Due to the bending-working of the leg portion 920, the deformation portion DP is excessively elongated and therefore cracks SC are created in a surface of the deformation portion DP. Such cracks SC reduce a strength of the fishing line guide. Moreover, if the fishing line guide having the cracks SC created in the deformation portion DP is used for fishing, then a fishing line may be caught on the cracks of the deformation portion DP. This leads to the breakage of the fishing line.

To increase the elongation amount of a metallic material so as to prevent the cracks created during the bending-working of the leg portion, it can be considered to enlarge a sectional area of the portion elongated between the annular body 821 and the leg portion 920 and to increase a press pressure. However, to increase the sectional area, it is necessary to make the thickness of the metallic sheet material thicker. This unavoidably increases the weight of the fishing line guide. In addition, to raise the press pressure during bending working increases the difficulty of the bending working and decreases a press speed. This leads to the decrease in productivity of the fishing line guide.

FIG. 3D shows another example of bending-working the leg portion according to a prior art. Referring to FIG. 3D, to reduce the difficulty in the bending working of the leg portion, the bending-starting portion 832 is located between the rear surface 823 of the annular body 821 and the support leg portion 830. If the bending-starting portion 832 is located as shown in FIG. 3D, the elongation amount of the deformation portion DP can decrease at an upper end of the support leg portion 830. However, because the bending-starting portion 832 is located at the rear surface 823 of the annular body 821, the concave portion CP is unavoidably formed between the annular body 821 (or the ring holding portion) and the support leg portion 830. Due to such a concave portion, the fishing line is caught on the fishing line guide, and a user must do a burdensome task of releasing the caught fishing line.

SUMMARY

Embodiments of the present disclosure solve the aforementioned problems of the prior art. Some embodiments of the present disclosure provide a fishing line guide including a ring holding portion which is drawn into a cylindrical shape so as to prevent the damage of a fishing line or the breakage of a guide ring. Further, some embodiments of the present disclosure provide a fishing line guide which does not have a concave portion which causes the fishing line to be caught between a ring holding portion and a support leg portion, and which does not have a crack which leads to breakage of the fishing line between the ring holding portion and the support leg portion. Further, some embodiments of the present disclosure provide a fishing line guide which has light weight and high strength. Further, some embodiments of the present disclosure provide a fishing line guide which prevents tangling or being caught of a fishing line and does not give a burdensome task of releasing the caught fishing line to a user. Further, some embodiments of the present disclosure provide a blank which is worked into the fishing line guide according to the aforementioned embodiment.

One aspect of the present disclosure provides a fishing line guide which is attached to a rod body of a fishing rod and guides a fishing line. A fishing line guide according to one embodiment includes a ring holding portion and a first support leg portion extending from the ring holding portion. The ring holding portion includes an inner peripheral portion, an outer peripheral portion and an annular portion extending in a circumferential direction between the inner peripheral portion and the outer peripheral portion. The ring holding portion is coupled to a guide ring at the inner peripheral portion. The first support leg portion extends downward from the ring holding portion. The first support leg portion has a pair of lateral surfaces that connect with the outer peripheral portion. The ring holding portion includes a pair of twisted portions. The pair of the twisted portions form a portion of the outer peripheral portion and a portion of the annular portion. The pair of the twisted portions are twisted respectively from the annular portion toward the pair of the lateral surfaces of the first support leg portion to the outer peripheral portion.

In one embodiment, when the fishing line guide is viewed from a lateral side, the ring holding portion has a width gradually decreasing from upper ends of the twisted portions toward lower ends of the twisted portions.

In one embodiment, when the fishing line guide is viewed from a lateral side, the ring holding portion has a width at lower ends of the twisted portions that is the same as a width at an upper end of the first support leg portion.

In one embodiment, the first support leg portion includes a curved portion which is bent with respect to the ring holding portion and which extends from a joint portion at which the first support leg portion connects with the ring holding portion. When the fishing line guide is viewed from a lateral side, a front contour of the curved portion lies on or is located further forward than a front contour of the ring holding portion.

In one embodiment, each of the pair of the twisted portions includes: a twisted surface extending while being twisted toward one of the pair of the lateral surfaces of the first support leg portion; an outer peripheral contour at which the outer peripheral portion meets with the twisted surface; and an inner peripheral contour at which the annular portion meets with the twisted surface. The twisted surface includes: a first surface forming a portion of the annular portion and adjoining the outer peripheral portion through the outer peripheral contour; a second surface which is continuous from the first surface in the circumferential direction and adjoins the outer peripheral portion and the annular portion respectively through the outer peripheral contour and the inner peripheral contour and is twisted toward one of the pair of the lateral surfaces of the first support leg portion; and a third surface which is continuous from the second surface in the circumferential direction and adjoins the annular portion through the inner peripheral contour and forms a portion of the outer peripheral portion.

In one embodiment, when the fishing line guide is viewed from a lateral side, the outer peripheral contour is continuous with a front contour of the first support leg portion and the inner peripheral contour is continuous with a rear contour of the first support leg portion.

In one embodiment, the fishing line guide further comprises a pair of second support leg portions extending from the annular portion of the ring holding portion respectively. The pair of the twisted portions are located respectively between a joint portion at which the first support leg portion connects with the outer peripheral portion and joint portions at which the pair of the second support leg portions connect with the annular portion.

In one embodiment, the outer peripheral portion has a curved surface which extends along the inner peripheral portion in the circumferential direction and is curved with respect to the inner peripheral portion and faces toward a tip of a fishing rod.

Another aspect of the present disclosure provides a fishing rod which includes the fishing line guide according to the aforementioned one embodiment. The fishing line guide is attached to a rod body.

A further aspect of the present disclosure provides a blank for a fishing line guide, which is worked into the fishing line guide according to the aforementioned one embodiment. The blank according to one embodiment comprises a head portion and a first leg portion extending from the head portion. The head portion of the blank is worked into the ring holding portion of the fishing line guide, and the first leg portion of the blank is worked into the first support leg portion of the fishing line guide. The head portion has a bending edge portion which forms the outer peripheral portion and the annular portion of the ring holding portion. The bending edge portion includes: a pair of first bending edge portions adjoining the first leg portion respectively, each of the first bending edge portions having a first bending width and becoming wider as the first bending edge portion extends away from the first leg portion with the first bending width increasing in a radial direction; and a second bending edge portion located between the pair of the first bending edge portions and having a second bending width that is uniform in the radial direction. As the first bending edge portions and the second bending edge portion are bent, outer peripheral surfaces of the first bending edge portions are formed into the pair of the twisted portions and an outer peripheral surface of the second bending edge portion is formed into a portion of the annular portion.

In one embodiment, when the first bending edge portions and the second bending edge portion are bent, a joint portion at which the first leg portion connects with the head portion is not bent.

In one embodiment, the fishing line guide has a pair of second support leg portions extending from the annular portion respectively. The blank comprises a pair of second leg portions which extend from the second bending edge portion respectively and are worked into the pair of the second support leg portions. The pair of the first bending edge portions are located respectively between a joint portion at which the first leg portion connects with the head portion and joint portions at which the pair of the second leg portions connect with the second bending edge portion.

BRIEF DESCRIPTION OF DRAWINGS

The accompanying drawings, which are incorporated in and constitute a part of the specification, illustrate embodiments of the present disclosure, and together with the general description given above and the detailed description of the embodiments given below, serve to explain the principles of the present disclosure.

FIG. 3C shows an example where a support leg portion is worked from the drawn annular body of the ring holding portion shown in FIG. 3B through bending working.

DETAILED DESCRIPTION

Figure 1:
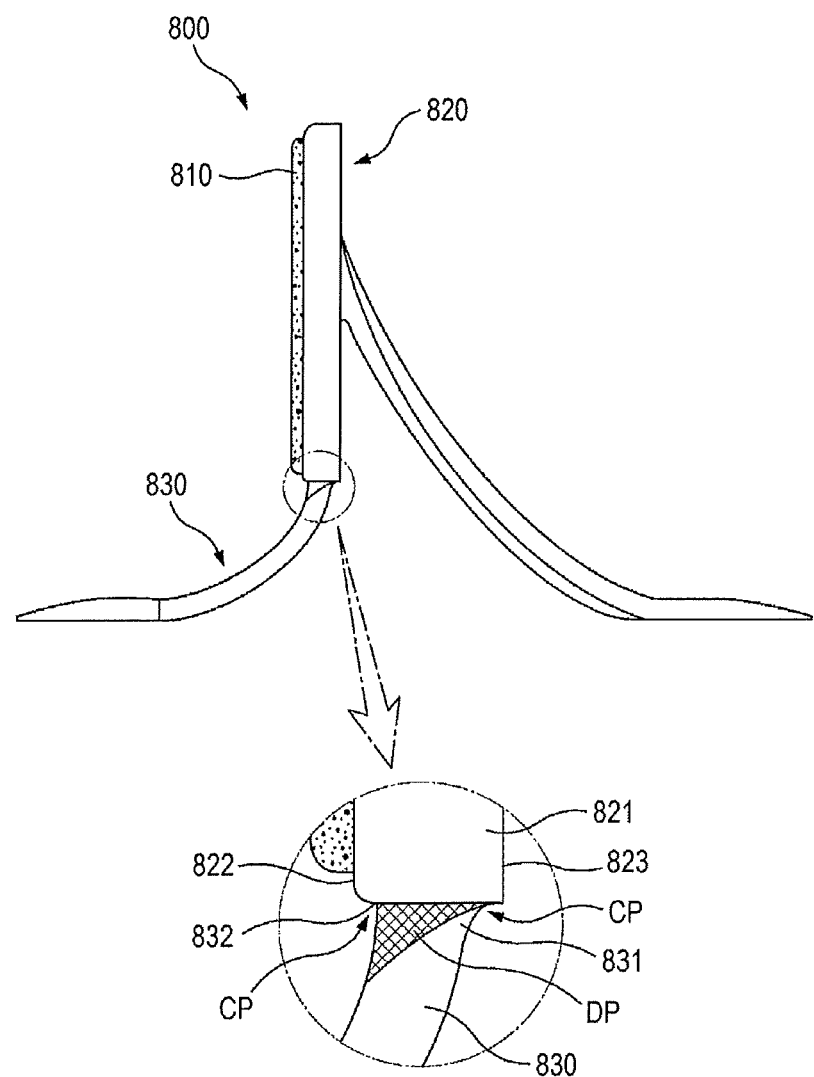
FIG. 1 is a side view showing a fishing line guide of a prior art.
Figure 2:
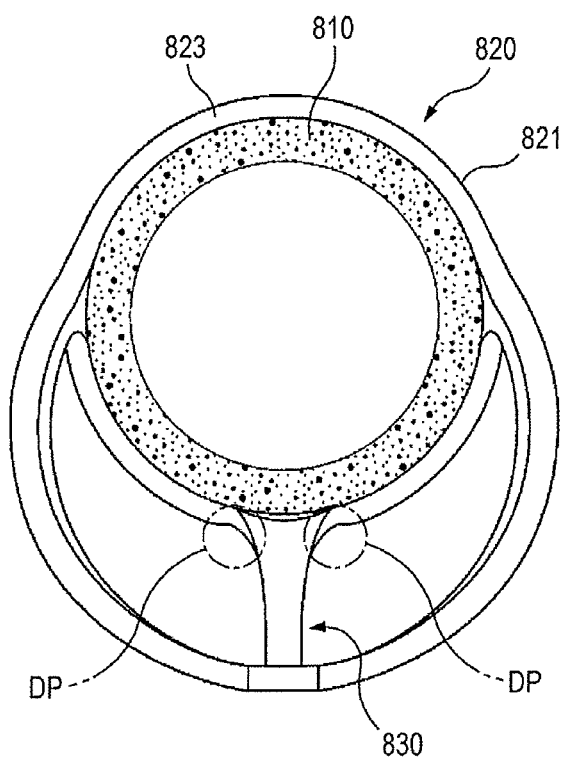
FIG. 2 is a rear view of the fishing line guide shown in FIG. 1.

Embodiments of the present disclosure are illustrated for the purpose of explaining the technical idea of the present disclosure. The scope of the rights according to the present disclosure is not limited to the embodiments presented below or the detailed descriptions of such embodiments.

All the technical terms and scientific terms in the present disclosure include meanings or definitions that are commonly understood by those of ordinary skill in the art unless otherwise defined. All terms in the present disclosure are selected for the purpose of describing the present disclosure more clearly, and are not selected to limit the scope of the present disclosure.

As used in the present disclosure, expressions such as "comprising", "including", "having", and the like are to be understood as open-ended terms having the possibility of encompassing other embodiments, unless otherwise mentioned in the phrase or sentence containing such expressions.

The singular expressions that are described in the present disclosure may encompass plural expressions unless otherwise stated, which will be also applied to the singular expressions recited in the claims.

The expressions, such as "first," "second," etc., which are shown in various embodiments of the present disclosure, are used to separate a plurality of elements from each other, and are not intended to limit an order or importance of the corresponding elements.

In the present disclosure, the description that one element is "connected," or "coupled" to another element should be appreciated to indicate that one element may be directly connected, or coupled, to another element, and should be further understood that a new element may be interposed between one element and another element.

The direction indication term 'frontward,' 'front' or the like as used herein means a direction directed toward a tip of a fishing rod, while the direction indication term 'rearward,' 'rear' or the like means a direction directed toward a butt of a fishing rod. Further, as used herein, the direction indication term 'upward,' 'upper' or the like is based on a direction in which a guide ring is positioned with respect to an attachment foot, while the direction indication term 'downward,' 'lower' or the like means a direction opposite to the upward or upper direction.

The term 'contour' as used herein refers to a line that is seen at the outermost side of an element or forms an edge of an element when a fishing line guide is viewed in one direction. For example, a 'front contour' refers to a line that forms an edge of the element which is located most frontward in a side view of a fishing line guide. For example, an 'outer peripheral contour' refers to a line that forms an outermost edge of the element.

Descriptions are made hereinafter as to the embodiments of the present disclosure with reference to the accompanying drawings. Like reference numerals in the drawings denote like or corresponding elements. Further, in the following description of the embodiments, duplicate descriptions for the same or corresponding elements may be omitted. However, even if the descriptions of the elements are omitted, such elements are not intended to be excluded in any embodiment.

Figure 4:
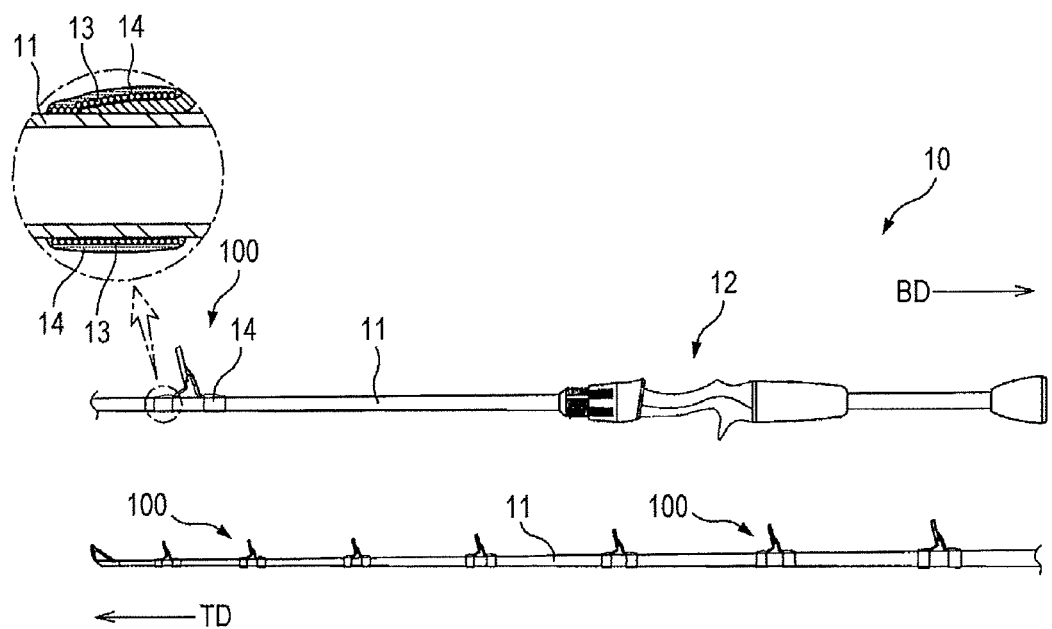
FIG. 4 is a side view showing a fishing rod according to one embodiment which includes a fishing line guide according to one embodiment.

FIG. 4 shows a fishing rod 10 according to one embodiment of the present disclosure. In FIG. 4, an arrow TD indicates a front direction directed to a tip of the fishing rod, while an arrow BD indicates a rear direction directed to a butt of the fishing rod.

Referring to FIG. 4, the fishing rod 10 includes a rod body 11. The rod body 11 has a long and thin cylindrical shape. The rod body 11 serves as a structure which resists to various external forces acting on the fishing rod 10 and maintains the shape of the fishing rod 10. The rod body 11 may consist of a single tubular rod. Alternatively, the rod body 11 may consist of a plurality of tubular rods. The fishing rod 10 includes a reel seat 12 in the vicinity of its rear end. A reel (not shown), which winds and accommodates a fishing line, may be detachably attached to the reel seat 12.

The fishing rod 10 includes a plurality of fishing line guides 100 which are attached to the rod body 11 and guide a fishing line. The fishing line guide 100 guides the fishing line which is unwound from the reel during casting a fishing rig or is wound around the reel during landing a fish. As shown in FIG. 4, a plurality of the fishing line guides 100, which have different sizes but have the same configuration, may be attached to the rod body 11.

The fishing line guide 100 may be firmly fixed to the rod body 11 by means of an attachment foot and a winding thread 13. That is, the attachment foot is firmly fixed to the rod body 11 by bringing the attachment foot into contact with the outer surface of the rod body 11 and then densely winding the winding thread 13 around both the attachment foot and a portion of the rod body 11 at which the attachment foot is located. After the winding thread 13 is wound, an adhesive is applied on the wound winding thread 13. If the adhesive is hardened, then an adhesive coating 14 is formed throughout the wound winding thread 13. The adhesive coating 14 prevents unwinding of the winding thread and fills in gaps between the adjacent winding threads.

Reference is made to FIGS. 5 to 12 for descriptions of the fishing line guide according to one embodiment of the present disclosure. FIGS. 5 to 8 show a side view, a front view, a rear view and a bottom view of the fishing line guide according to one embodiment, respectively. The fishing line guide according to one embodiment comprises a guide ring, a ring holding portion and a support leg portion.

Figure 5:
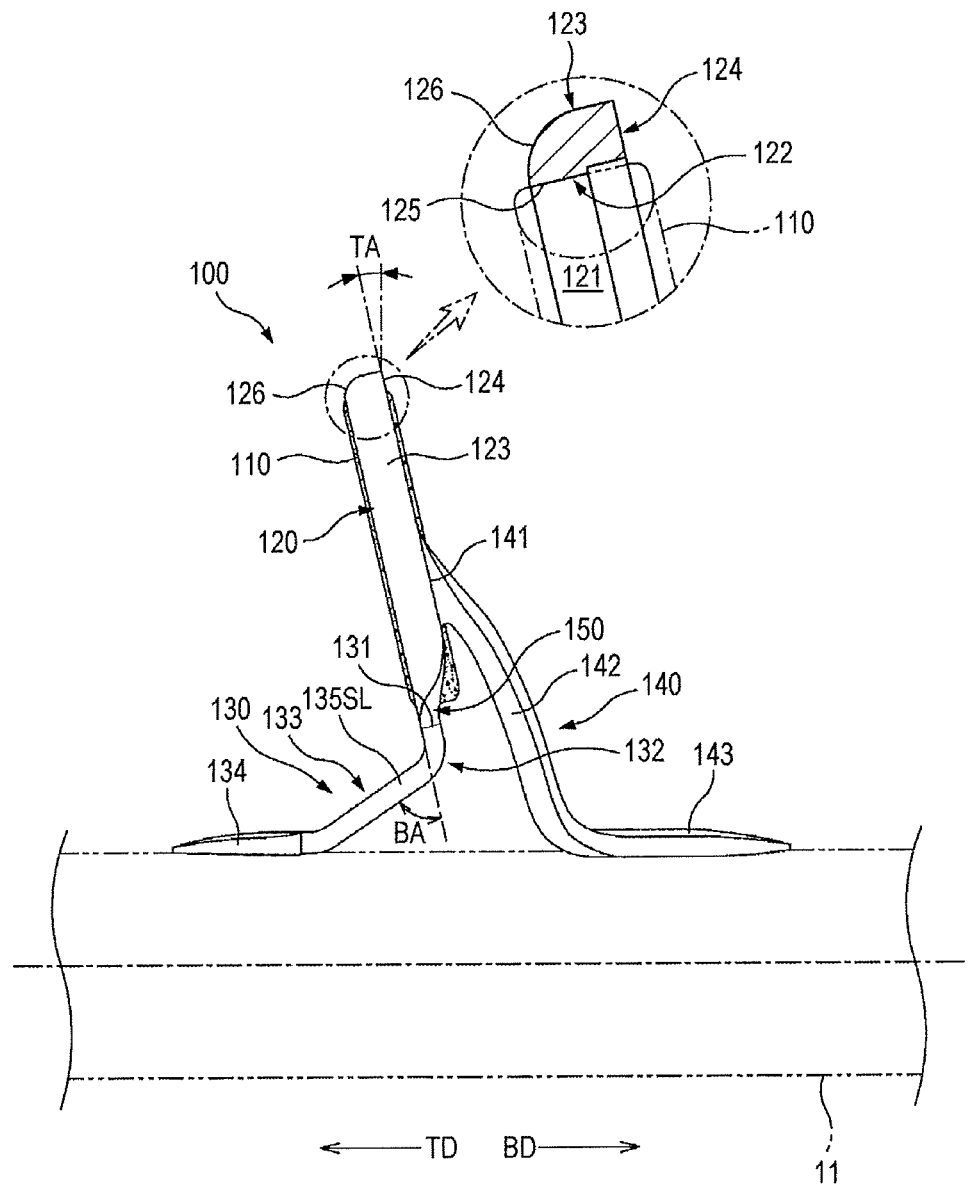
FIG. 5 is a side view of a fishing line guide according to one embodiment.
Figure 6:
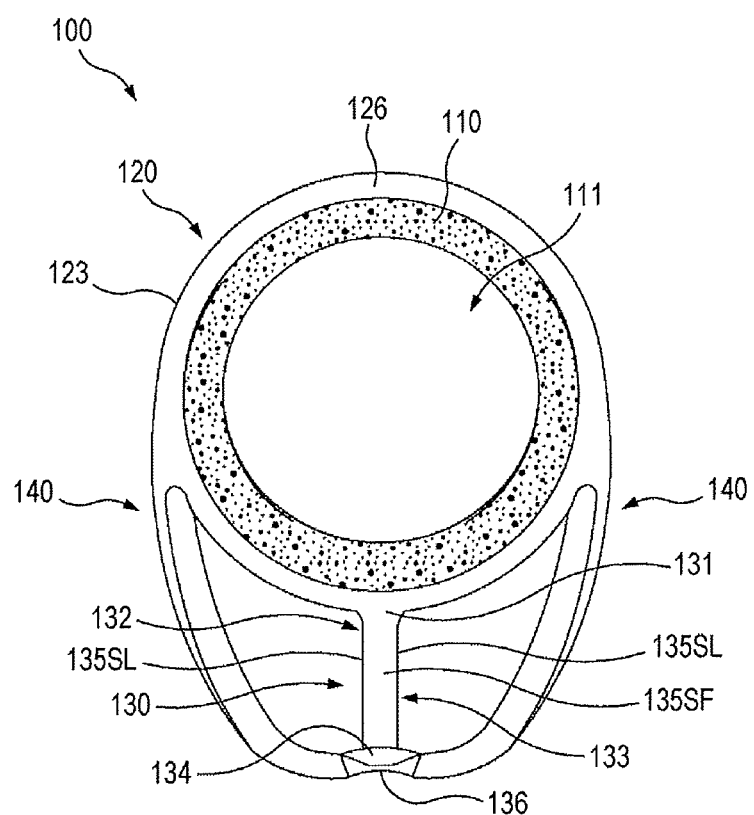
FIG. 6 is a front view of a fishing line guide according to one embodiment.

Reference is made to FIGS. 5 and 6 as to the guide ring. The guide ring 110 has a ring shape and is formed with a circular opening 111 therein. An outer peripheral surface of the guide ring 110 is formed as a flat surface. The guide ring 110 contacts the fishing line at an inner peripheral surface of the opening 111. The fishing line is guided by the fishing line guide 100 while passing through the opening 111 of the guide ring 110. The guide ring 110 may be made of a hard material such as a ceramic material which has a superior wear resistance.

Reference is made to FIGS. 5 to 8 as to the ring holding portion and the support leg portion. The ring holding portion 120 is configured to hold the guide ring 110. The support leg portion 130, 140 extends from the ring holding portion 120 and supports the ring holding portion 120 with respect to the rod body 11. The ring holding portion 120 and the support leg portion 130, 140 are formed integrally. By way of example, a blank, which has a shape formed by spreading the fishing line guide to a development figure, may be obtained from a metallic sheet by press-working (e.g., blanking) the metallic sheet. A workpiece, in which the ring holding portion 120 and the support leg portion 130, 140 are integrally formed, may be formed by press-working (e.g., drawing, bending) such a blank. After such a workpiece is formed, the guide ring 110 may be coupled to the ring holding portion 120. Since the guide ring 110 is a part to be coupled to the ring holding portion 120, the workpiece in which the ring holding portion 120 and the support leg portion 130, 140 are integrally formed may be referred to as the fishing line guide 100.

A circular ring holding hole 121, which corresponds to the guide ring 110, is perforated in the ring holding portion 120 in forward and rearward directions of the ring holding portion 120. By way of example, the ring holding portion 120 may be formed by drawing an approximately circular portion of the blank into a cylindrical shape and then forming the ring holding hole 121 in the drawn cylindrical portion. Therefore, the ring holding portion 120 comprises an annular body with the ring holding hole 121 formed therein. The ring holding portion 120, which is formed as the annular body, has an inner peripheral portion 122, an outer peripheral portion 123 and an annular portion 124.

The inner peripheral portion 122 is an inner peripheral surface of the annular body which forms the ring holding portion 120. The guide ring 110 may be coupled to the ring holding portion 120 by fitting through the inner peripheral portion 122. Then, the guide ring 110 may be firmly fixed to the ring holding portion 120 by applying an adhesive between the inner peripheral portion 122 and the ring holding portion 120. The inner peripheral portion 122 has at least an annular fitting surface 125, and the guide ring 110 is coupled to the fitting surface 125. The fitting surface 125 defines the ring holding hole 121.

The outer peripheral portion 123 is an outer peripheral surface of the annular body which forms the ring holding portion 120. In this embodiment, referring to FIG. 5, the outer peripheral portion 123 meets with the inner peripheral portion 122 at its front edge, and the annular portion 124 is located at rear edges of the inner peripheral portion 122 and the outer peripheral portion 123. In other embodiment, the annular portion 124 may be located at the front sides of the inner peripheral portion 122 and the outer peripheral portion 123. Further, in this embodiment, the outer peripheral portion 123 has a curved surface 126 along its front edge. The curved surface 126 is located opposite to the annular portion 124 and is disposed so as to face toward the tip of the fishing rod. The curved surface 126 extends along the inner peripheral portion 122 in a circumferential direction and is curved at a certain curvature with respect to the inner peripheral portion 122. As shown in FIG. 5, when the fishing line guide is viewed from a lateral side, the curved surface 126 of the outer peripheral portion 123 forms a portion of a front end surface of the ring holding portion 120. The front end surface of the ring holding portion 120 may have a flat surface in the area excluding the curved surface 126. For example, the front end surface of the ring holding portion 120 may have a flat surface at a joint portion between the outer peripheral portion 123 and the support leg portion 130.

Figure 7:
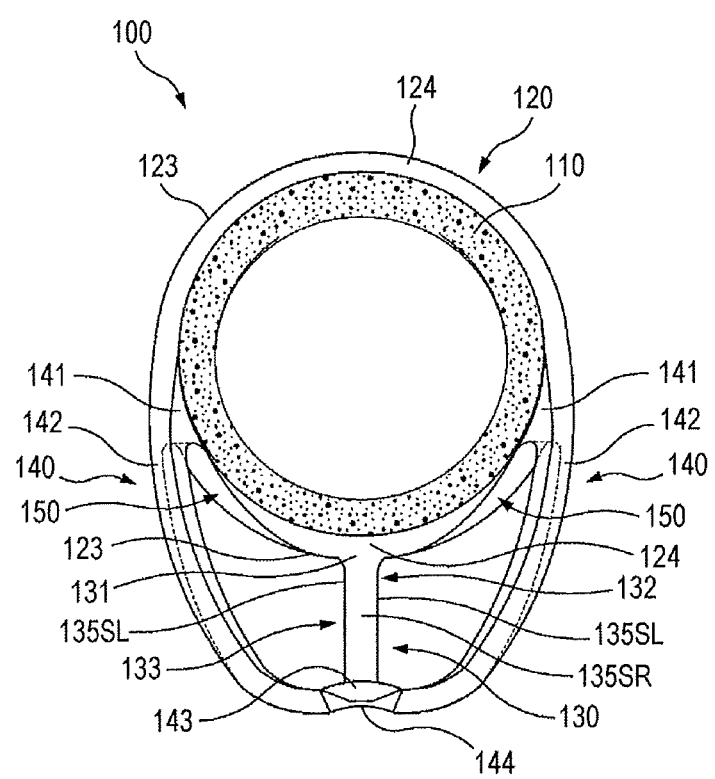
FIG. 7 is a rear view of a fishing line guide according to one embodiment.

Referring to FIGS. 5 and 7, the annular portion 124 extends between the inner peripheral portion 122 and the outer peripheral portion 123 in the circumferential direction of the ring holding portion 120, and interconnects the inner peripheral portion 122 and the outer peripheral portion 123. In this embodiment, the annular portion 124 is located so as to face toward the butt of the fishing rod, i.e., so as to face in the rearward direction. Therefore, when the fishing line guide is viewed from the lateral side as shown in FIG. 5, the annular portion 124 forms a rear end surface of the ring holding portion 120. When the fishing line guide is viewed from the lateral side, the rear end surface of the ring holding portion 120 is not a single flat surface. A lower portion of the rear end surface is located closer to the front end surface than the remainder of the rear end surface.

The support leg portion 130, 140 extends from the ring holding portion 120. The support leg portion 130, 140 is, at a portion thereof, contacted with the rod body 11 of the fishing rod. In this embodiment, the support leg portion 130, 140 comprises a first support leg portion 130 and a pair of second support leg portions 140. The fishing line guide according to some embodiment may include only the first support leg portion 130.

The first support leg portion 130 extends downward from the ring holding portion 120 and is bent with respect to the ring holding portion 120. The first support leg portion 130 includes a joint portion 131, a curved portion 132, a support portion 133, and a first attachment foot 134. The first support leg portion 130 connects with the ring holding portion 120 at the joint portion 131. The curved portion 132 extends from the joint portion 131 and is bent with respect to the ring holding portion 120. The support portion 133 extends from the curved portion 132. The first attachment foot 134 extends from the support portion 133. The first support leg portion 130 comes into contact with the rod body 11 of the fishing line guide at the first attachment foot 134. At the joint portion 131, the curved portion 132 and the support portion 133 of the first support leg portion, the first support leg portion 130 has surfaces defining the shape of the first support leg portion 130. That is, the first support leg portion 130 has a pair of lateral surfaces 135SL, a front surface 135SF, and a rear surface 135SR. The lateral surfaces 135SL directly connect with the outer peripheral portion 123 of the ring holding portion 120. Further, the lateral surfaces 135SL extend from the outer peripheral portion 123 of the ring holing portion 120. The front surface 135SF faces toward the tip of the fishing rod, while the rear surface 135SR faces toward the butt of the fishing rod. The rear surface 135SR directly connects with the annular portion 124 of the ring holding portion 120.

Figure 3A:
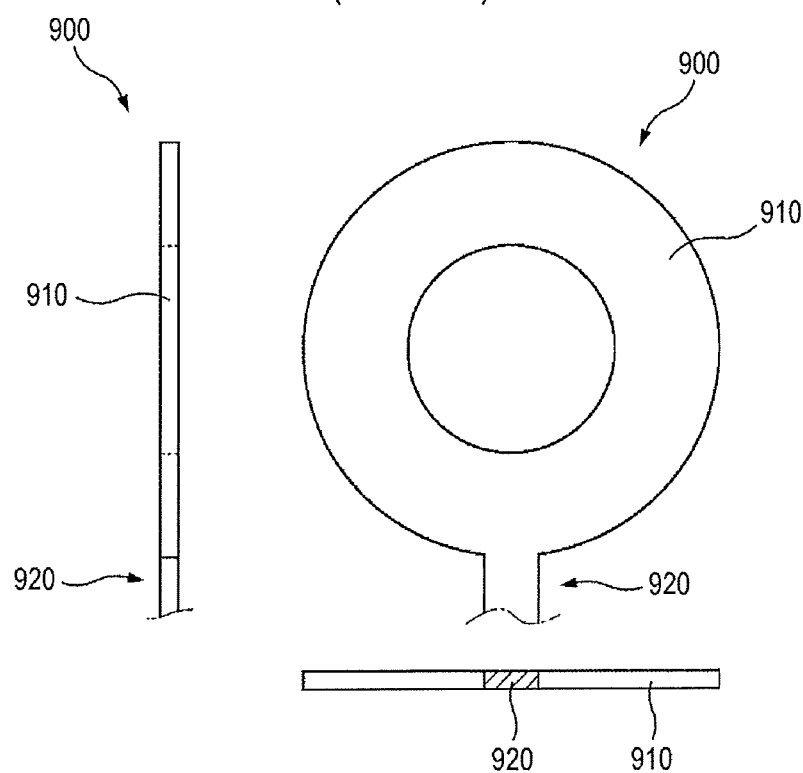
FIG. 3A shows a portion of a blank which is worked into the fishing line guide of a prior art.
Figure 3B:
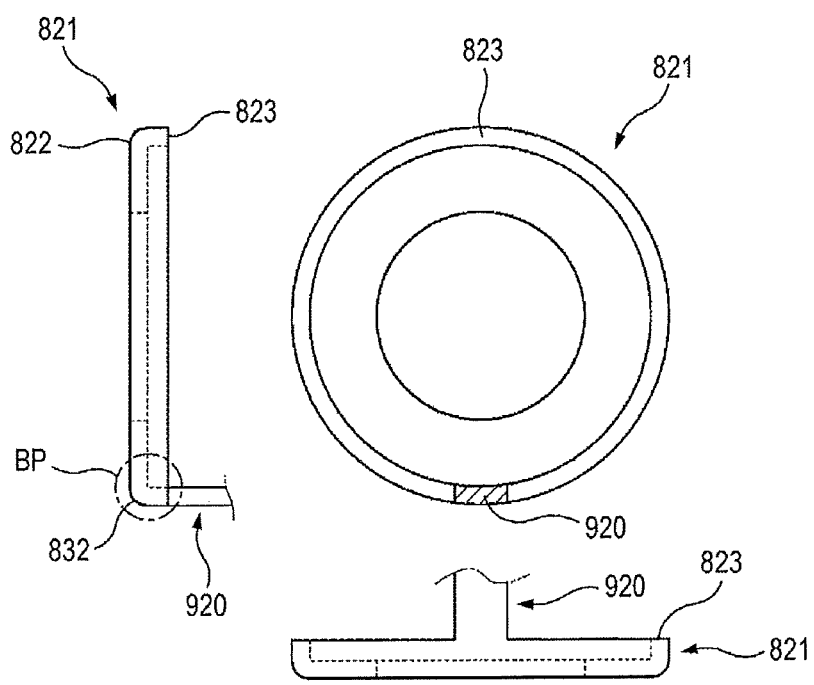
FIG. 3B shows an example where a disk-shaped portion of the blank shown in FIG. 3A is worked into an annular body of a ring holding portion through drawing working.
Figure 3D:
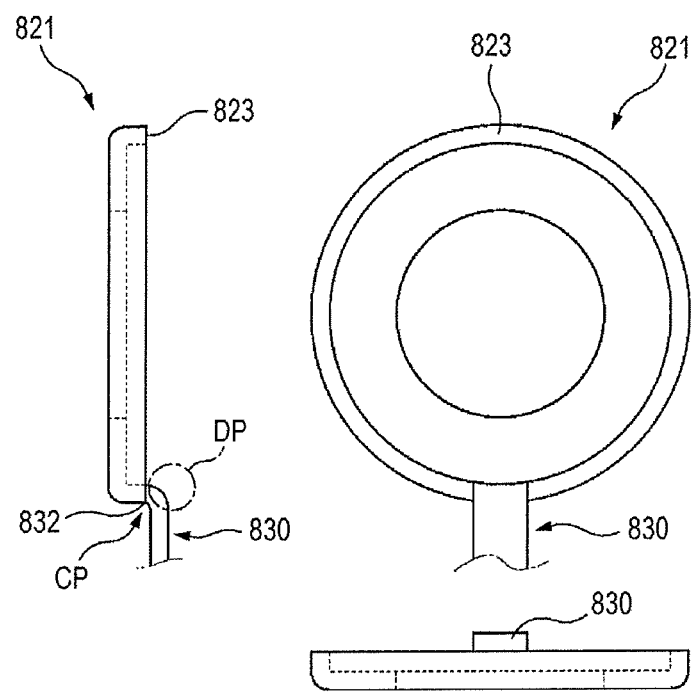
FIG. 3D shows another example where a support leg portion is worked from the drawn annular body of the ring holding portion shown in FIG. 3B through bending working.

The joint portion 131 forms a boundary between the ring holding portion 120 and the first support leg portion 130. The joint portion 131 may slightly protrude from the outer peripheral portion 123. The joint portion 131 extends from the outer peripheral portion 123 and the annular portion 124 without being bent at a lower end area of the ring holding portion 120. Therefore, the joint portion 131 does not have defects such as cracks as shown in FIG. 3C. This is because the joint portion 131 is subjected to no bending action and is not deformed when the annular body of the ring holding portion 120 is formed through drawing working. Accordingly, at the joint portion 131, the surface of the annular portion 124 and the rear surface 135SR of the first support leg portion 130 form a non-curved flat surface. Further, at the joint portion 131, the surface of the outer peripheral portion 123 (a lower portion of the front end surface of the ring holding portion 120) and the front surface 135SF of the first support leg portion 130 form a non-curved flat surface.

The curved portion 132 is bent from the joint portion 131, and the support portion 133 extends straight from the curved portion 132. Due to the curved portion 132, the support portion 133 is bent with respect to the ring holding portion 120 at a predetermined bent angle BA. The bent angle BA may be appropriately selected between the ring holding portion 120 and the first support leg portion 130. In some embodiment, the curved portion 132 and the support portion 133 may be curved in a circular arc shape.

The first attachment foot 134 is bent with respect to the support portion 133 at a predetermined bent angle. The first attachment foot 134 has a lower surface 136 which is in contact with the outer surface of the rod body 11. The lower surface 136 may comprise a concave round surface. The support portion 133 and the first attachment foot 134 are bent such that the ring holding portion 120 is tilted with respect to an axial line of the rod body 11 at a tilting angle TA. Such tilting of the ring holding portion 120 is effective for untangling of the tangle of the fishing line. By way of one example, the tilting angle TA may be appropriately selected in the range of zero degree to 45 degree. In some embodiment, the ring holding portion 120 may be located perpendicularly to the axial line of the rod body 11 (i.e., when the tilting angle TA is zero degree), and the support portion 133 and the first attachment foot 134 may be bent such that the ring holding portion 120 is located perpendicularly.

Figure 8:
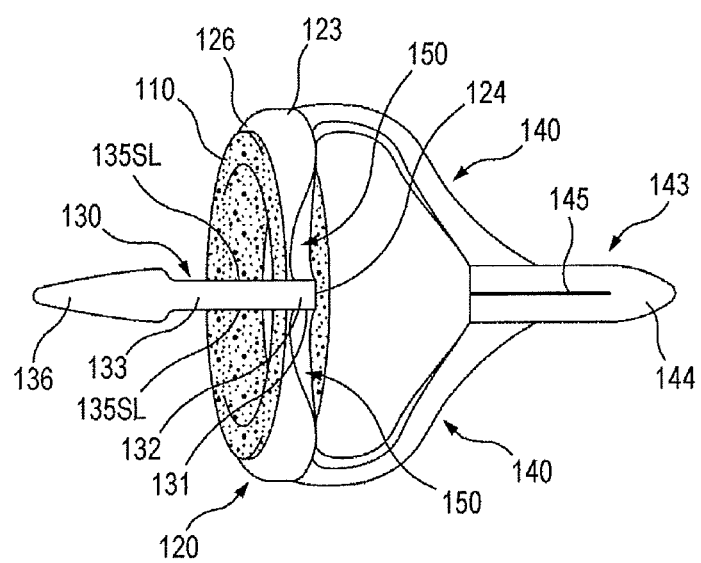
FIG. 8 is a bottom view of a fishing line guide according to one embodiment.

Each of the second support leg portions 140 extends downward and rearward from a lateral end of the ring holding portion 120. Each of the second support leg portions 140 extends from the annular portion 124 of the ring holding portion 120. Each of the second support leg portion 140 includes a joint portion 141, a support portion 142, and a second attachment foot 143. The second support leg portion connects with the annular portion 124 at the joint portion 141. The support portion 142 extends curvedly from the joint portion 141. The second attachment foot 143 extends from the support portion 142. The joint portion 141 forms a boundary between the annular portion 124 and the second support leg portion 140, and directly extends from the annular portion 124. Each of the second support leg portions 140 gets close to each other in the vicinity of its terminal end. The second attachment foot 143 extends from a pair of the support portions 142, and is bent with respect to a pair of the support portions 142. As shown in FIG. 8, the second attachment foot 143 takes a U-like shape, and has a lower surface 144 that is in contact with the outer surface of the rod body 11. The lower surface 144 may comprise a concave round surface. The second attachment foot 143 has a slit 145 therein. The slit 145 extends longitudinally and is perforated through the second attachment foot 143 in a vertical direction.

In the fishing line guides of the embodiments, the ring holding portion 120 includes a pair of twisted portions 150 throughout a predetermined range upward from the joint portion 131 which is between the ring holding portion 120 and the support leg portion (e.g., the first support leg portion 130). Each of the twisted portions 150 adjoins the support leg portion (e.g., the first support leg portion 130). When the annular body of the ring holding portion 120 is formed through the drawing working, the twisted portions 150 are created on the surface of the ring holding portion 120.

Figure 9:
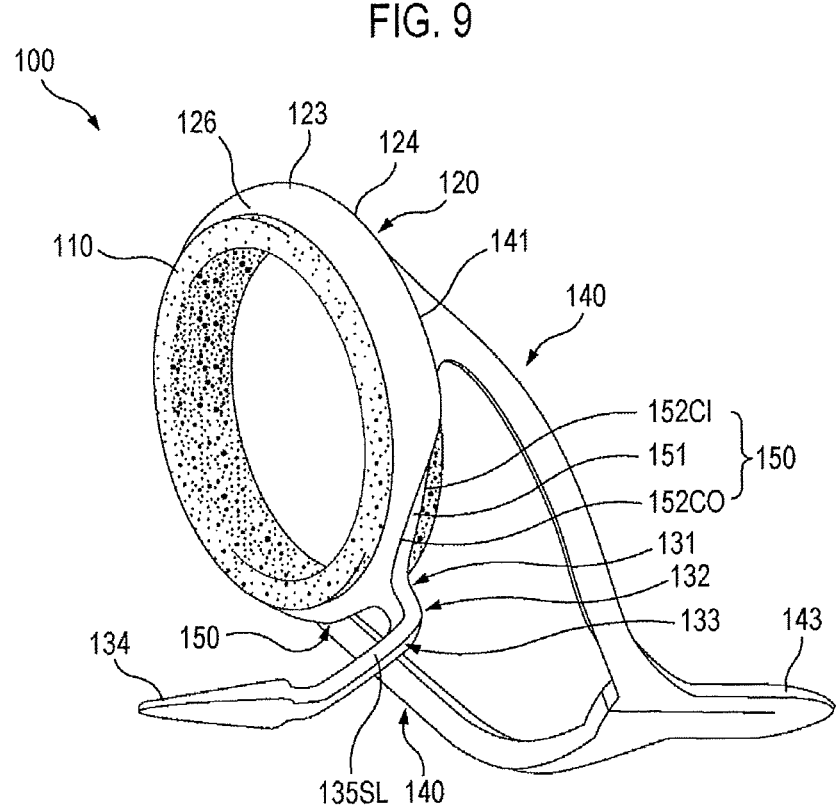
FIG. 9 is a front perspective view of a fishing line guide according to one embodiment.
Figure 10:
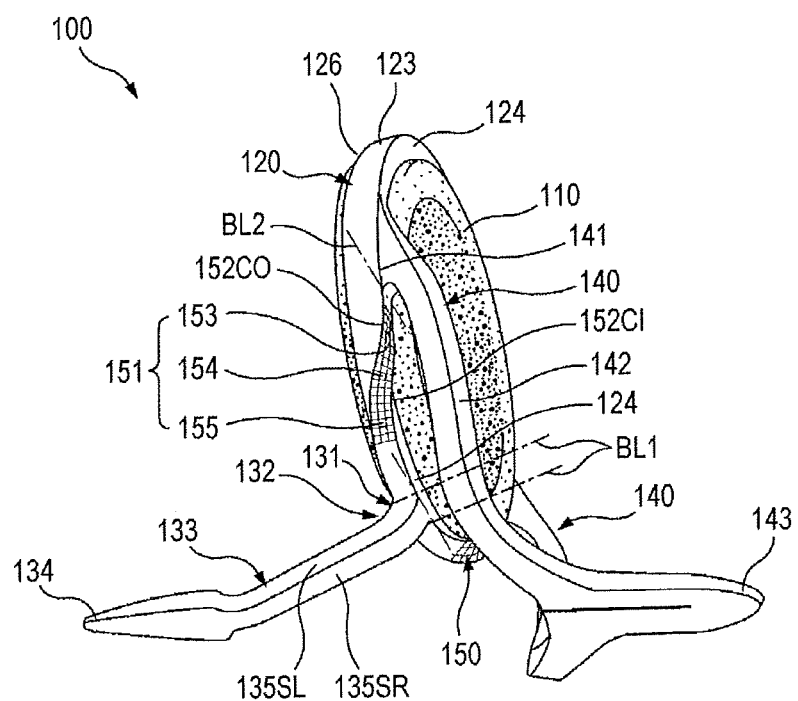
FIG. 10 is a rear perspective view of a fishing line guide according to one embodiment.
Figure 11:
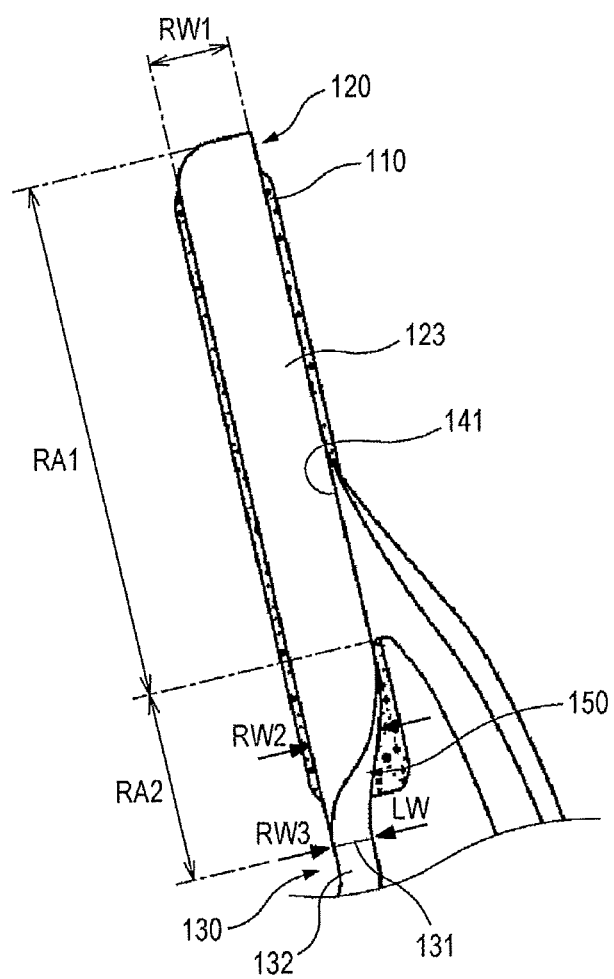
FIG. 11 is an enlarged side view showing a portion of a fishing line guide according to one embodiment.

FIGS. 9 and 10 is front and rear perspective views of the fishing line guide shown in FIG. 5, respectively. FIG. 11 is an enlarged side view showing the ring holding portion. Reference is made to FIGS. 9 to 11 for detailed description of the twisted portions formed in the ring holding portion.

A pair of the twisted portions 150 are symmetrical with respect to the first support leg portion 130. A pair of the twisted portions 150 are positioned at a lower side of the ring holding portion 120 and adjoin the joint portion 131 of the first support leg portion 130. In this embodiment, a pair of the twisted portions 150 are positioned respectively between the joint portion 131 at which the first support leg portion 130 connects with the outer peripheral portion 123 and the joint portions 141 at which a pair of the second support leg portions 140 connect with the annular portion 124. In case of a fishing line guide according to an embodiment which does not include the second support leg portion, a pair of the twisted portions 150 may be positioned in the ring holding portion 120 throughout predetermined ranges in opposite directions from the joint portion 131 of the first support leg portion 130.

Each of the twisted portions 150 extends along the outer periphery of the ring holding portion 120 from the joint portion 131 of the first support leg portion 130 toward the joint portion 141 of the second support leg portion 140. Each of the twisted portions 150 extends upward from an upper end of the lateral surface 135SL of the first support leg portion 130, or from the outer peripheral portion 123 of the ring holding portion somewhat spaced from the upper end of the lateral surface 135SL. Each of the twisted portions 150 is continuously twisted from the annular portion 124 to the outer peripheral portion 123 toward the lateral surface 135SL of the first support leg portion 130. Therefore, in the ring holding portion 120, each of the twisted portions 150 forms both a portion of the outer peripheral portion 123 and a portion of the annular portion 124.

In an embodiment, each of the twisted portions 150 includes a twisted surface 151, an outer peripheral contour 152CO, and an inner peripheral contour 152CI. The twisted surface 151 is twisted from the annular portion 124 to the outer peripheral portion 123 toward the lateral surface 135SL of the first support leg portion 130. The outer peripheral portion 123 and the twisted surface 151 meet with each other at the outer peripheral contour 152CO. The annular portion 124 and the twisted surface 151 meet with each other at the inner peripheral contour 152CI. Therefore, in this embodiment, the twisted surface 151 may be defined by the following: the outer peripheral contour 152CO; the inner peripheral contour 152CI; a boundary BL1 between the outer peripheral portion 123 and the lateral surface 135SL of the first support leg portion 130; and a boundary BL2 between the annular portion 124 and the second support leg portion 140.

The twisted surface 151 comprises a twisted curved surface which is twisted from the annular portion 124 toward the upper end of the lateral surface 135SL of the first support leg portion 130. The twisted surface 151 extends throughout the annular portion 124 and the outer peripheral portion 123 while being twisted. When the fishing line guide 100 is viewed from a rear side and a bottom side, the twisted surface 151 extends toward the lateral surface 135SL of the first support leg portion 130 while being counterclockwise twisted from the boundary BL2 between the second support leg portion 140 and the annular portion 124. Since the twisted surface 151 is twisted from the annular portion 124 to the outer peripheral portion 123 as described above, the twisted surface 151 may be divided into three surfaces. That is, the twisted surface 151 may include the following: a first surface 153 which is located at an upper end; a second surface 154 which is continuous from the first surface 153 in a circumferential direction; and a third surface 155 which is continuous from the second surface 154 in the circumferential direction. The first surface 153 forms a portion of the annular portion 124 and adjoins the outer peripheral portion 123 through the outer peripheral contour 152CO. The second surface 154 adjoins the outer peripheral portion 123 and the annular portion 124 respectively through the outer peripheral contour 152CO and the inner peripheral contour 152CI, and is twisted toward one of the lateral surfaces 135SL of the first support leg portion 130. The third surface 155 adjoins the annular portion 124 through the inner peripheral contour 152CI, and forms a portion of the outer peripheral portion 123. The second surface 154 of the twisted surface 151 is twisted so as to extend over both the annular portion 124 and the outer peripheral portion 123. The second surface 154 of the twisted surface 151 may become an area which transitions from the annular portion 124 to the outer peripheral portion 123 in a spiral shape.

Due to the twisted portion 150, the ring holding portion 120 has a width that gradually decreases toward a lower end at which the first support leg portion 130 connects with the ring holding portion 120. In this regard, said width means a minimum distance between the front and rear end surfaces of the ring holding portion 120 when the fishing line guide is viewed from a lateral side. Referring to FIG. 11, when the fishing line guide is viewed from the lateral side, the ring holding portion 120 has a uniform width RW1 in an area RA1 ranging from an upper end of the outer peripheral portion 123 to an upper end of the twisted portion 150. Further, in an area RA2 ranging from the upper end of the twisted portion 150 to a lower end of the twisted portion 150, the ring holding portion 120 has a width RW2 which gradually decreases from the upper end of the twisted portion 150 toward the lower end of the twisted portion 150. As such, the ring holding portion 120 has the width RW2 gradually decreasing toward the lower end. This is because a corresponding portion of the blank, which is drawn into the ring holding portion 120, has a varying bending width.

When the annular body of the ring holding portion 120 is formed through the drawing working, the twisted portion 150 is formed by a bending action accompanied by the drawing working, but the joint portion 131 of the first support leg portion 130 is not subjected to the bending action accompanied by the drawing working. Due to the twisted portion 150, the joint portion 131 of the first support leg portion 130 is connected to both the outer peripheral portion 123 and the annular portion 124 without being bent with respect to the ring holding portion 120. The drawing working of the ring holding portion 120 is completed without the bending action on the joint portion 131 during the drawing working of the ring holding portion 120. As such, the bending action which excessively elongates a metallic material does not act on the joint portion 131. Thus, the joint portion 131 is not deformed and does not have defects such as cracks. Therefore, according to the embodiments, in the area of the fishing line guide which includes the joint portion 131 adjacent to the twisted portion 150, the thickness does not increase or decrease because of the drawing working. That is, as shown in FIG. 11, when the fishing line guide is viewed from a lateral side, a width RW3 of the lower end of the twisted portion 150 of the ring holding portion 120 is the same as a width LW of the upper end of the first support leg portion 130.

Figure 12:
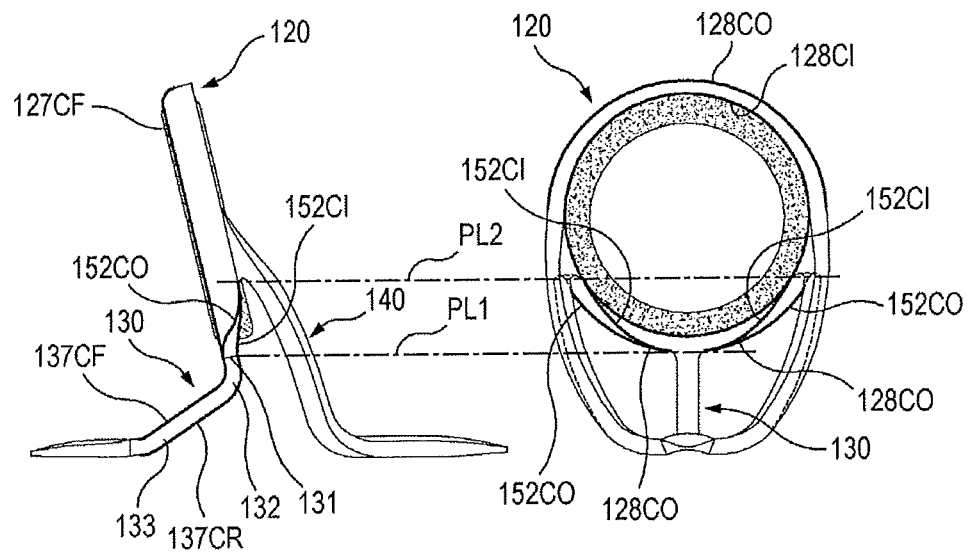
FIG. 12 shows side and rear views of a fishing line guide according to one embodiment together.

As described above, when the annular body of the ring holding portion 120 is formed by the drawing working, the twisted portions 150 are created in the ring holding portion 120, but the joint portion 131 is not subjected to the bending action accompanied by the drawing working. The fishing line guide has a characteristic shape due to the twisted portions. Descriptions are made as to the characteristic shape of the fishing line guide with reference to FIGS. 5 to 7 and 12. FIG. 12 shows side and rear views of a fishing line guide according to an embodiment together, and further schematically shows contours of the elements of the fishing line guide. In FIG. 12, a straight line PL1 indicates the position of the joint portion between the ring holding portion 120 and the first support leg portion 130, and a straight line PL2 indicates the position of the joint portion between the ring holding portion 120 and the second support leg portion 140. Further, in FIG. 12, a curved line 128CO indicates an outer peripheral contour of the ring holding portion 120 (an outer peripheral contour of the outer peripheral portion), and a curved line 128CI indicates an inner peripheral contour of the ring holding portion 120 (an inner peripheral contour of the annular portion).

At the joint portion 131, the front surface 135SF of the first support leg portion 130 and the front end surface of the ring holding portion 120 (the front lower surface of the outer peripheral portion 123) form a non-curved flat surface. Specifically, when the fishing line guide is viewed from a lateral side as shown in FIG. 12, a front contour 127CF of the ring holding portion 120 and a front contour 137CF of the first support leg portion 130 form a straight line at the joint portion 131. Further, a front contour of the curved portion 132, which becomes a portion of the front contour 137CF, becomes a curved line that is directed forward from the front contour 127CF of the ring holding portion 120. That is, when the fishing line guide is viewed from a lateral side, the front contour of the curved portion 132 lies on the front contour 127CF of the ring holding portion 120 or is located further forward than the front contour 127CF of the ring holding portion 120. Accordingly, the fishing line guide 100 has no concave portion which causes a fishing line to be caught between the ring holding portion 120 and the first support leg portion 130. The first support leg portion 130 is located further forward than the front contour 127CF of the ring holding portion 120. Specifically, the support portion 133 of the first support leg portion 130 is located further forward than the front contour 127CF of the ring holding portion 120, and is not located rearward from the front contour 127CF of the ring holding portion 120.

When the fishing line guide 100 is viewed from a rear side, the outer peripheral contour 152CO of the twisted portion 150 forms a portion of an outer peripheral contour 128CO of the ring holding portion 120, and an inner peripheral contour 152CI of the twisted portion 150 connect with an inner peripheral contour 128CI of the ring holding portion 120. When the fishing line guide 100 is viewed from a lateral side, the outer peripheral contour 152CO of the twisted portion 150 unbrokenly connects with the front contour 137CF of the first support leg portion 130. The outer peripheral contour 152CO of the twisted portion 150 becomes a curved line that is twisted toward the front contour 137CF of the first support leg portion 130. Further, when the fishing line guide is viewed from a lateral side, the inner peripheral contour 152CI of the twisted portion 150 unbrokenly connects with a rear contour 137CR of the first support leg portion 130. The inner peripheral contour 152CI of the twisted portion 150 becomes a curved line that is twisted toward the rear contour 137CR of the first support leg portion 130.

Descriptions are made with reference to FIGS. 13 to 19 as to an example where tangling of a fishing line occurs in the fishing line guide according to one embodiment and an example where such tangling is untangled.

Figure 13:
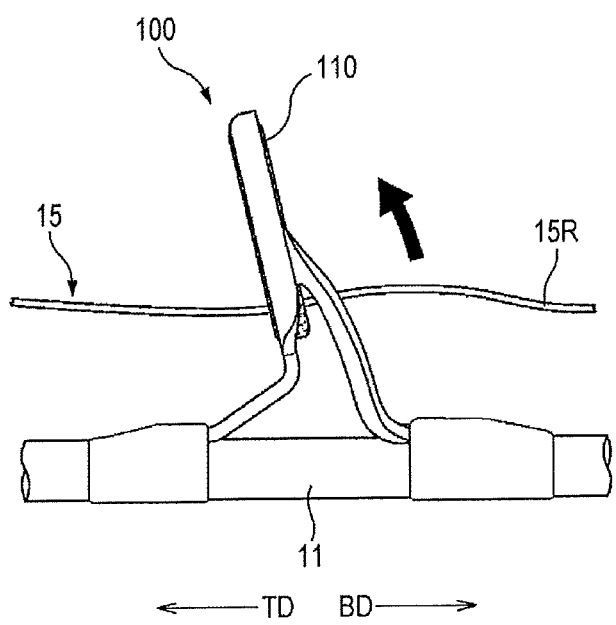
FIG. 13 shows a fishing line guide according to one embodiment and a fishing line.
Figure 14:
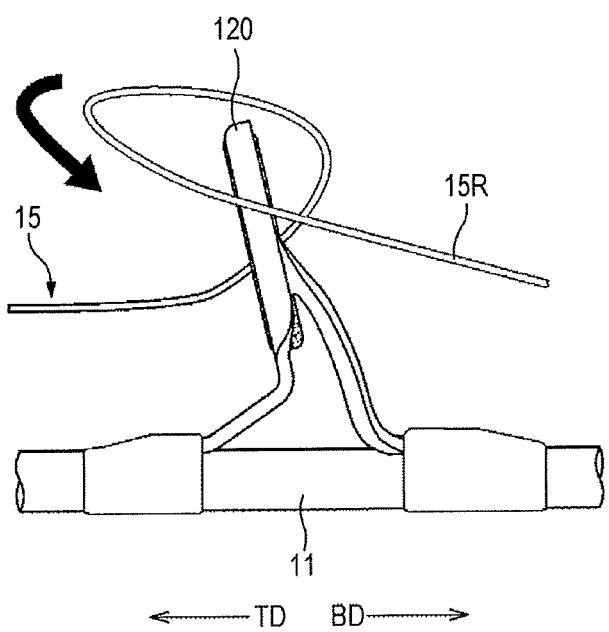
FIG. 14 illustrates the state where a fishing line covers a fishing line guide.
Figure 15:
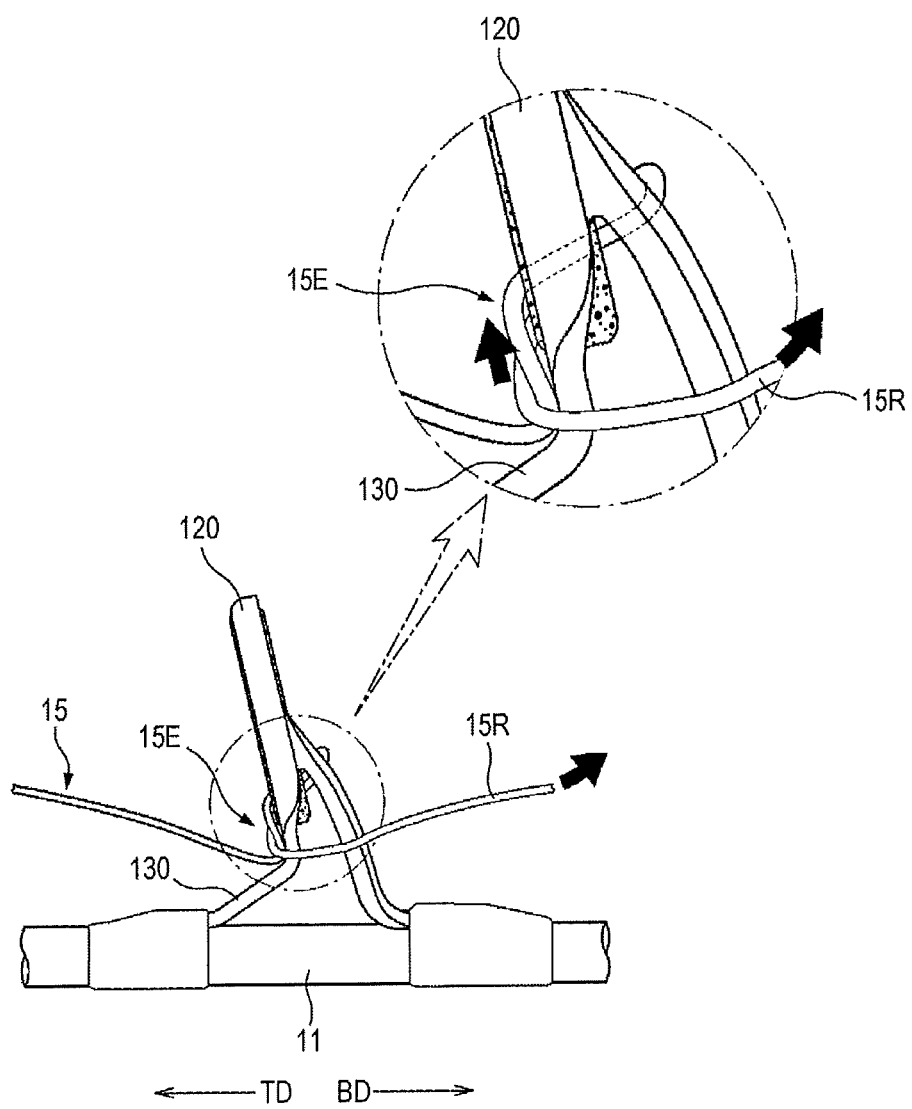
FIG. 15 shows an example where a fishing line is tangled between a ring holding portion and a support leg portion.
Figure 16:
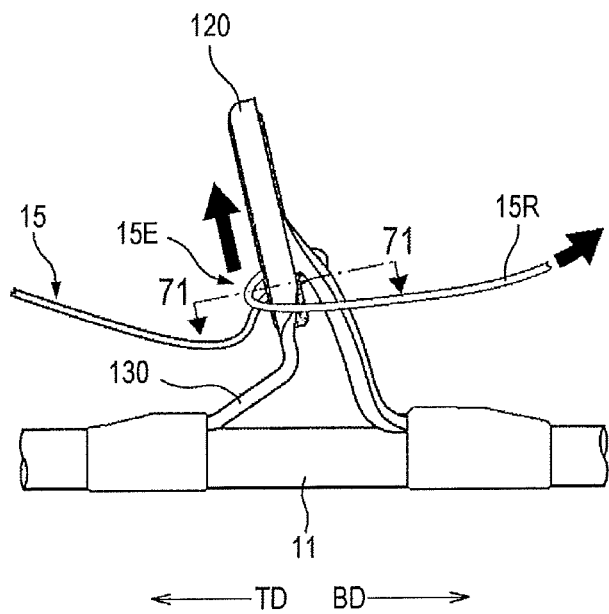
FIG. 16 shows the movement of the fishing line shown in FIG. 15.
Figure 17:
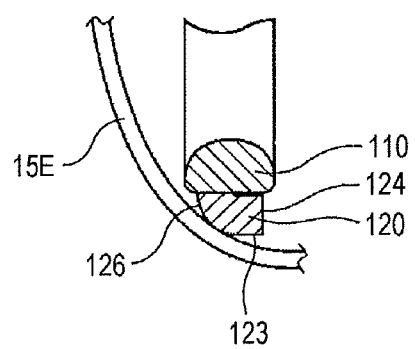
FIG. 17 shows a portion of the sectional shape taken along the line 71-71 of FIG. 16.
Figure 18:
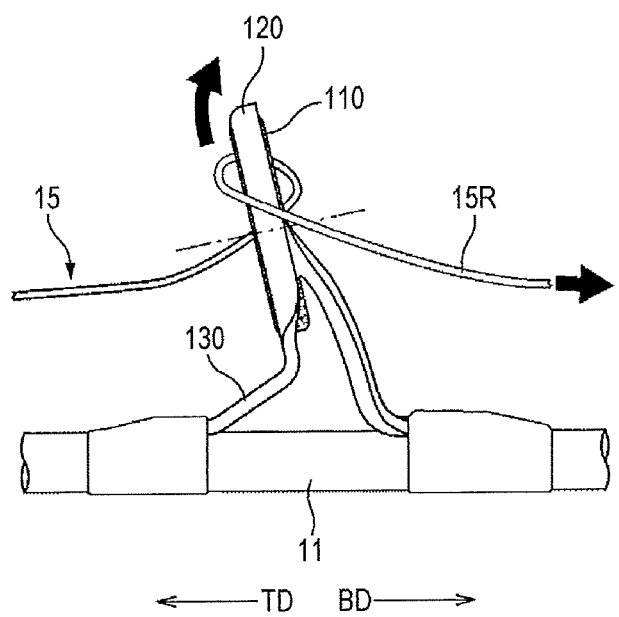
FIG. 18 shows the movement of the fishing line shown in FIG. 16.
Figure 19:
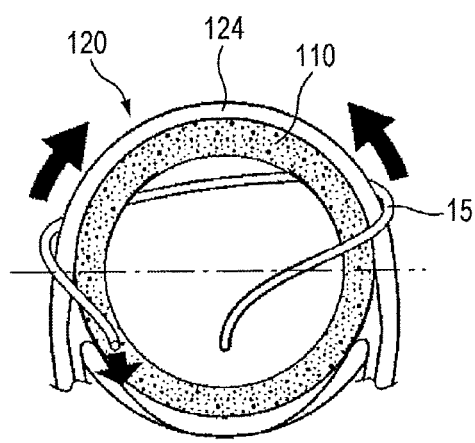
FIG. 19 shows the movement of the fishing line shown in FIG. 16.

Referring to FIG. 13, a fishing line 15 passes through the guide ring 110, and an upward force may be applied to the fishing line 15 due to wind or due to user's manipulation that loosens the fishing line. Referring to FIG. 14, the fishing line 15 may be wound around the ring holding portion 120 while the fishing line 15 covers the ring holding portion 120. Referring to FIG. 15, the fishing line 15 is wound around the first support leg portion 130 at an underside of the ring holding portion 120 and a line tangle 15E may be created. In the state where the line tangle of the fishing line occurs as shown in FIG. 15, a portion 15R of the fishing line, which is located in the rearward direction BD, may be moved upward by a user or by a force applied to the fishing line. Therefore, the line tangle 15E of the fishing line may be pulled out upward from the first support leg portion 130 through the ring holding portion 120. No concave portion exists between the ring holding portion 120 and the first support leg portion 130. Thus, the line tangle 15E can be moved while smoothly sliding from the first support leg portion 130 to the ring holding portion 120. Referring to FIGS. 16 and 17, when the line tangle 15E of the fishing line 15 escapes upward, the line tangle 15E comes into contact with the curved surface 126 of the outer peripheral portion 123. Such a curved surface 126 reduces friction resistance between the fishing line 15 and the ring holding portion 120, and the fishing line 15 can be easily slid upward. Referring to FIGS. 18 and 19, if the fishing line 15 covering the ring holding portion is moved above a center of the guide ring 110, then the fishing line 15 can escape upward along the ring holding portion 120 by being pulled of the portion 15R of the fishing line in the rearward direction BD with little force.

Figure 20:
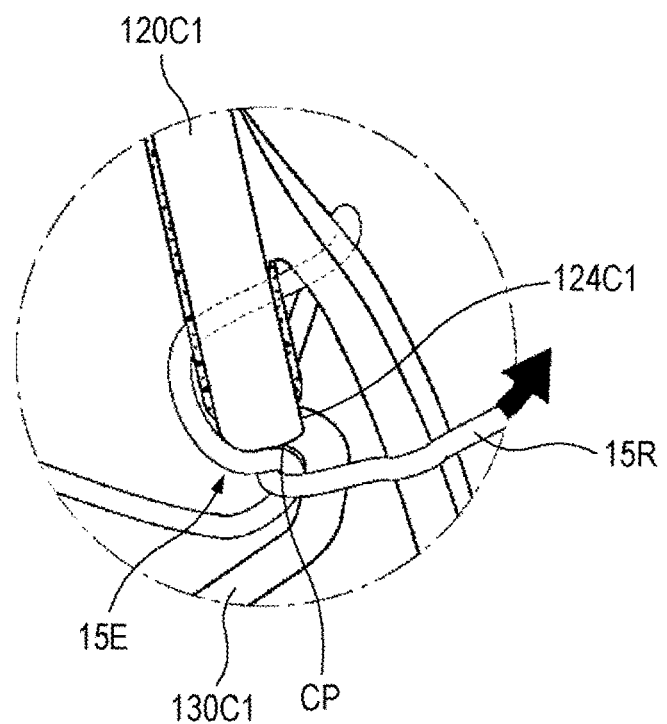
FIG. 20 shows a comparative example where the tangled fishing line cannot be moved.
Figure 21:
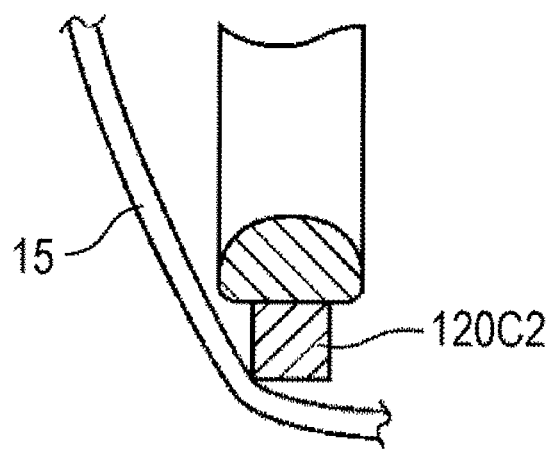
FIG. 21 shows a comparative example where a right-angled edge is formed in a ring holding portion.

FIGS. 20 and 21 show fishing line guides according to a comparative example in which tangling of a fishing line cannot be easily untangled. Referring to FIG. 20, in a fishing line guide according to a comparative example in which a first support leg portion 130C1 is bent from an annular portion 124C1 of a ring holding portion 120C1, a concave portion CP is formed between the ring holding portion 120C1 and the first support leg portion 130C1. Therefore, the line tangle 15E of the fishing line 15 is caught by the concave portion CP. Although a force is applied to the portion 15R of the fishing line in the rearward direction, the line tangle 15E is difficult to escape upward. Referring to FIG. 21, in a fishing line guide according to a comparative example in which a ring holding portion 120C2 has a right-angled edge, the fishing line 15 comes into contact with the right-angled edge of the ring holding portion 120C2. Therefore, friction increases between the fishing line 15 and the ring holding portion 120C2, and the fishing line 15 is difficult to escape upward.

The fishing line guide of the embodiments can be made from a blank which is obtained by blanking a metallic sheet. The fishing line guide of the embodiments can be made by press-working (drawing, bending, etc.) the blank into the shape of the fishing line guide according to the embodiments. With reference to FIGS. 22 to 30, descriptions are made as to the blank which is used for manufacturing the fishing line guide according to one embodiment, and as to an example where the ring holding portion of the fishing line guide according to one embodiment is formed from such a blank.

Figure 22:
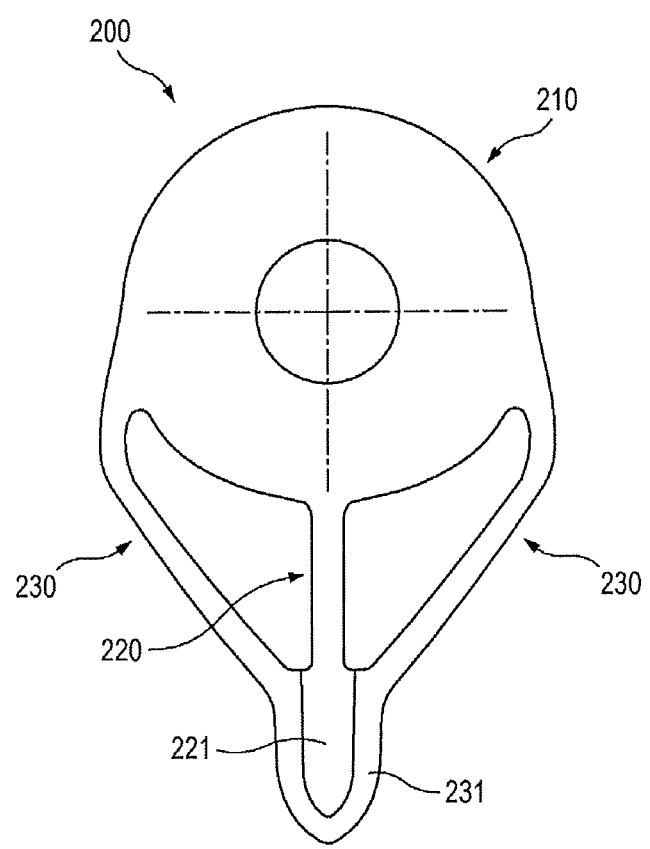
FIG. 22 shows a blank which is worked into a fishing line guide according to one embodiment.

FIG. 22 shows a blank which is used for manufacturing the fishing line guide according to one embodiment. Referring to FIG. 22, the blank 200 comprises a head portion 210, a first leg portion 220, and a pair of second leg portions 230. The blank 200 according to other embodiment may comprise only the head portion 210 and the first leg portion 220. The head portion 210 is worked into the ring holding portion according to the embodiments by drawing the head portion 210 into a cylindrical shape. The first leg portion 220 extends from a lower end of the head portion 210. The first leg portion 220 has, at a free end, a first foot portion 221. The first leg portion 220 is worked into the first support leg portion of the fishing line guide according to one embodiment by bending the first leg portion 220. A pair of the second leg portion 230 extends from lateral ends of the head portion 210 respectively, and have, at a free end, a second foot portion 231. The second leg portion 230 is worked into the second support leg portion according to one embodiment by bending the second leg portion 230. The bending of the first leg portion 220 and the second leg portion 230 may be performed after the head portion 210 is completely worked into the ring holding portion.

Figure 23:
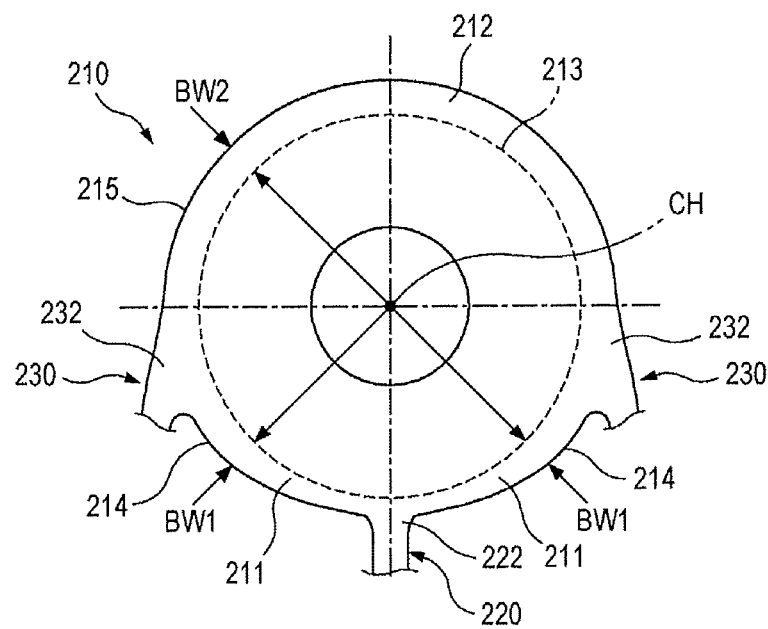
FIG. 23 schematically shows a head portion and a portion of a leg portion in the blank.

FIG. 23 schematically shows the head portion and a portion of the leg portion in the blank. Referring to FIG. 23, the head portion 210 has a circular opening at its center and has a shape of an approximately circular plate. The head portion 210 has a bending edge portion 211, 212 that forms a peripheral portion of the head portion 210. The bending edge portion 211, 212 is bent in a thickness direction of the head portion 210, thus forming both the outer peripheral portion and the annular portion of the ring holding portion according to one embodiment. The bending edge portion 211, 212 forms an approximately annular shape. The head portion 210 has a circular non-bending portion 213 inwardly of the bending edge portion 211, 212.

The bending edge portion 211, 212 comprises a pair of first bending edge portions 211 and a second bending edge portion 212. The pair of the first bending edge portions 211 extend along an outer periphery of the non-bending portion 213 and form a portion of the outer peripheral portion of the head portion 210. The pair of the first bending edge portions 211 adjoin the first leg portion 220 respectively, and extend in a circumferential direction of the head portion 210. Each of the first bending edge portions 211 has a first bending width BW1 that increases in a radial direction. Each of the first bending edge portions 211 becomes wider as the first bending edge portion extends away from the first leg portion 220 with the first bending width BW1 increasing in the radial direction. The second bending edge portion 212 is located between the pair of the first bending edge portions 211, and forms a portion of the outer peripheral portion of the head portion 210. The second bending edge portion 212 has a second bending width BW2 that is uniform in the radial direction. As the first bending edge portion 211 is bent with respect to the non-bending portion 213 during drawing the head portion 210, an outer peripheral surface 214 of the first bending edge portion 211 is formed into the above-described twisted portion. Further, as the second bending edge portion 212 is bent with respect to the non-bending portion 213 during drawing the head portion 210, an outer peripheral surface 215 of the second bending edge portion 212 is formed into a portion of the above-described annular portion of the ring holding portion.

A joint portion 222 at which the first leg portion 220 connects with the head portion 210 becomes the joint portion of the first support leg portion according to one embodiment. The joint portion 222 of the first leg portion 220 is not drawn during drawing the head portion 210. That is, when the first bending edge portions 211 and the second bending edge portion 212 are bent with respect to the non-bending portion 213, the joint portion 222 is not subjected to the bending action. The pair of the second leg portions 230 extend from the second bending edge portion 212 of the head portion 210 respectively. In this embodiment, the pair of the first bending edge portions 211 are positioned respectively between the joint portion 222 at which the first leg portion 220 connects with the head portion 210 and the joint portions 232 at which the pair of the second leg portions 230 connect with the second bending edge portion 212. An upper end of each first bending edge portion 211 may adjoin a lower end of the joint portion 232. In other embodiment, the joint portion 232 may be spaced from the first bending edge portion 211 in a circumferential direction.

Figure 24:
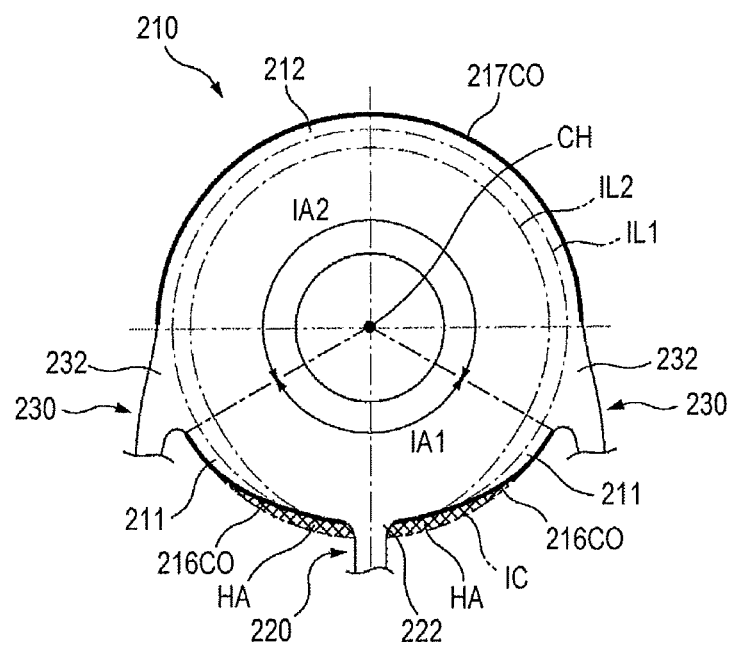
FIG. 24 shows the head portion and a portion of the leg portion in the blank, and further shows contours of the head portion.

FIG. 24 shows the head portion and a portion of the leg portion in the blank, and further shows contours of the head portion. The first bending edge portion 211 takes the shape of a circular arc which has a first inner angle IA1 with respect to a center point CH of the non-bending portion 213, and the second bending edge portion 212 takes the shape of a circular arc which has a second inner angle IA2 with respect to the center point CH. In FIG. 24, the first inner angle IA1 is an obtuse angle, and the second inner angle IA2 is greater than the first inner angle IA1. Alternatively, the first inner angle IA1 may be equal to or greater than 180 degree depending upon the position of the second leg portion 230, and the second inner angle IA2 may be smaller than the first inner angler IA1. Further, an outer peripheral contour of the head portion 210 has a first outer peripheral contour 216CO which is an edge of the first bending edge portions 211, and a second outer peripheral contour 217CO which is an edge of the second bending edge portion 212. The first outer peripheral contour 216CO has a curvature smaller than a curvature of the second outer peripheral contour 217CO. Therefore, the first outer peripheral contour 216CO forms a curved line which is located inwardly from a circumference line of an imaginary circle IC which is centered at the center point CH and includes the second outer peripheral contour 217CO. Therefore, the head portion 210 has an area smaller than an area of the imaginary circle IC which includes the second outer peripheral contour 217CO. That is, the head portion 210 has an area which is obtained by subtracting an hatched area HA from the area of the imaginary circle. A blank for a fishing line guide according to a prior at has a head portion which has the area of the imaginary circle IC. However, the head portion 210 according to one embodiment of the present disclosure has the first outer peripheral contour 216CO which is located inwardly from the circumference line of the imaginary circle IC. Accordingly, the ring holding portion formed from the head portion 210 has a light weight, and the fishing line guide according to one embodiment also has a light weight accordingly. In FIG. 24, an imaginary line IL1 can correspond to the outer peripheral contour of the ring holding portion (the outer peripheral contour of the outer peripheral portion shown in FIG. 12), and an imaginary line IL2 can correspond to the inner peripheral contour of the ring holding portion (the inner peripheral contour of the annular portion shown in FIG. 12).

Figure 25:
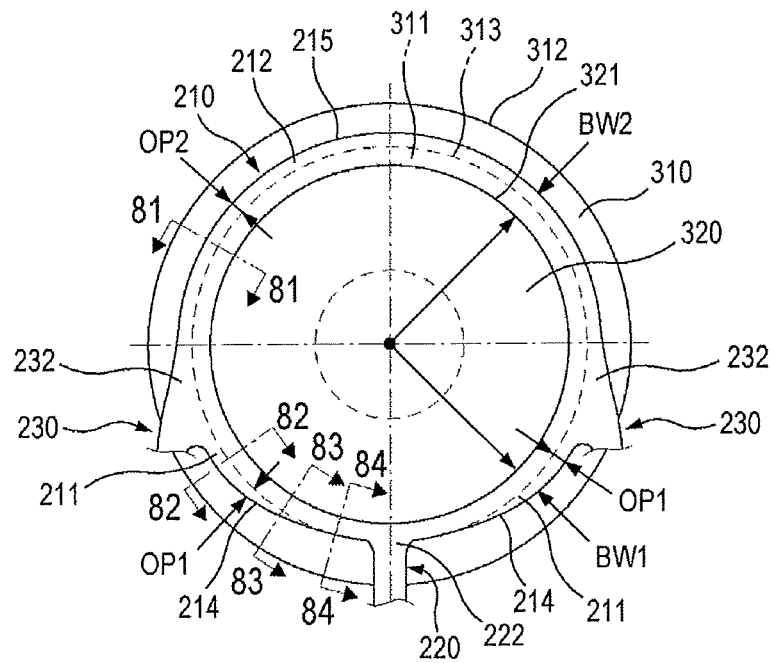
FIG. 25 schematically shows the head portion of the blank before being drawn, a drawing die, and a drawing punch.
Figure 26A:
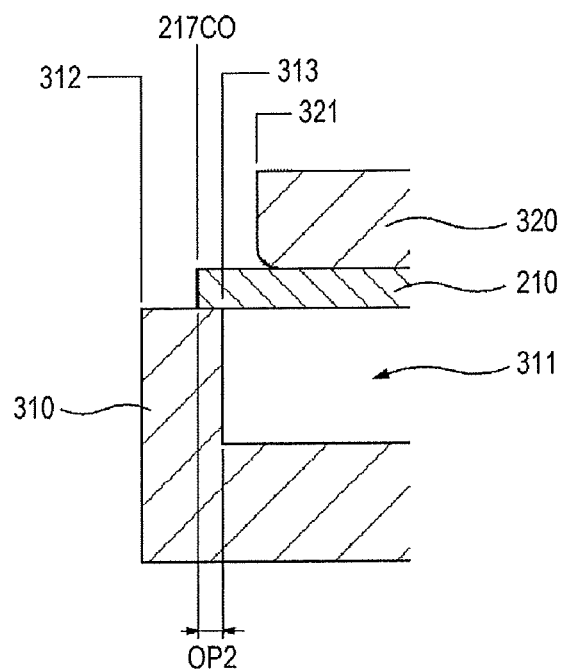
FIG. 26A shows a schematic sectional shape taken along the line 81-81 of FIG. 25.
Figure 26B:
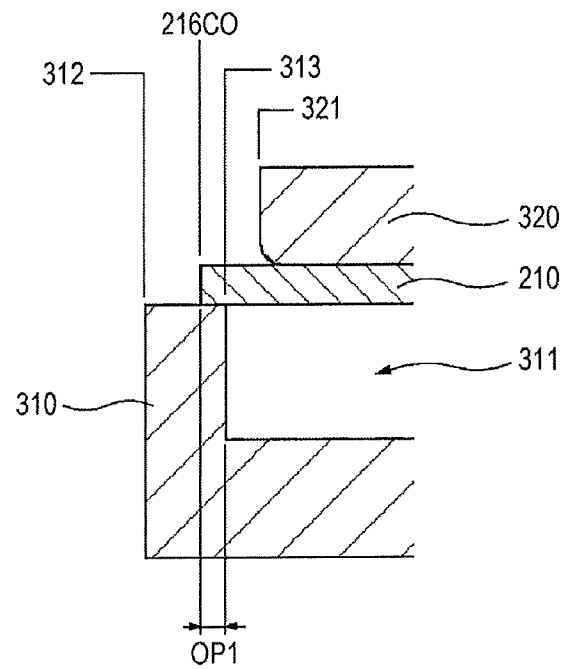
FIG. 26B shows a schematic sectional shape taken along the line 82-82 of FIG. 25.
Figure 26C:
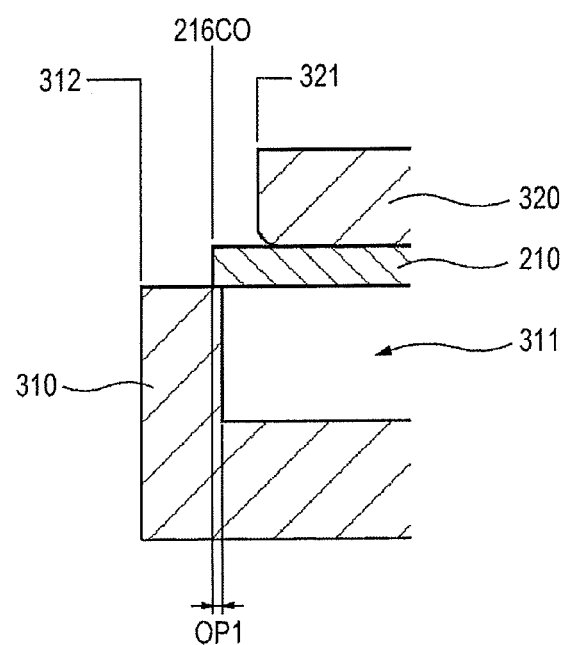
FIG. 26C shows a schematic sectional shape taken along the line 83-83 of FIG. 25.
Figure 26D:
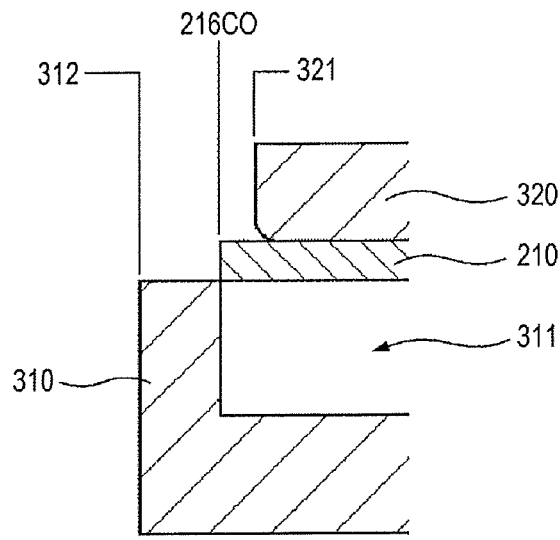
FIG. 26D shows a schematic sectional shape taken along the line 84-84 of FIG. 25.

By way of example, the head portion 210 may be worked into the ring holding portion through drawing working by means of a drawing die and a drawing punch. FIG. 25 schematically shows the head portion of the blank before being drawn, the drawing die, and the drawing punch. FIGS. 26A to 26D show schematic sectional shapes taken along the lines 81-81, 82-82, 83-83 and 84-84 of FIG. 25, respectively. With reference to FIGS. 25 to 26D, arrangement of the drawing die and the head portion before drawing working is described.

Referring to FIG. 25, the drawing die 310 has a drawing hole 311 therein, and the drawing hole 311 has a diameter corresponding to the annular portion of the ring holding portion. The drawing punch 320 has a diameter corresponding to an inner diameter of the annular portion. Further, the drawing punch 320 has a diameter corresponding to the non-bending portion of the head portion. The head portion 210 is situated between the drawing die 310 and the drawing punch 320. The drawing working of the head portion 210 may be performed by forcibly pressing the head portion 210 into the drawing hole 311 by the drawing punch 320. That is, as the drawing punch 320 is inserted into the drawing hole 311, the first and second bending edge portions 211 and 212 are bent with respect to the non-bending portion 213, thereby working the head portion 210 into the ring holding portion. As the head portion 210 is drawn into the annular body of the ring holding portion, the above-described twisted portions are created in the ring holding portion, but no bending action is applied to the joint portion 222 of the first leg portion 220. In FIG. 25, reference numeral 312 denotes an outer periphery of the drawing die 310, and reference numeral 313 denotes an inner periphery of the drawing die 310 which defines the drawing hole 311. Further, reference numeral 321 denotes an outer periphery of the drawing punch 320.

As shown in FIG. 25, the head portion 210 is disposed on the drawing die 310 so that the first bending edge portions 211 and the second bending edge portion 212 is overlapped with the drawing die 310 at the outside of the drawing hole 311. Overlap portions OP1 and OP2 exist between the outer peripheral portion of the head portion 210 and the inner periphery 313 of the drawing die 310. The first bending width BW1 of the first bending edge portion 211 increases in the radial direction. Therefore, the first overlap portion OP1 between the first bending edge portion 211 and the drawing die 310 becomes wider as the first overlap portion extends away from the first leg portion 220 with a radial width increasing in the radial direction. The second bending width BW2 of the second bending edge portion 212 is uniform in the radial direction. Therefore, the second overlap portion OP2 between the second bending edge portion 212 and the drawing die 310 has a width which is uniform in the radial direction along the inner periphery 312 of the drawing die. The first overlap portion OP1 becomes gradually narrow from the second leg portion 230 toward the first leg portion 220. That is, as shown in FIGS. 25 and 26B, the first overlap portion OP1 becomes gradually narrow toward the first leg portion 220, and, as shown in FIG. 26D, the first overlap portion hardly exists in the vicinity of the first leg portion 220. As such, the first overlap portion OP1 between the first outer peripheral contour 216CO of the head portion 210 and the inner periphery 313 of the drawing die 310 decreases gradually toward the first leg portion 220. Thus, the width of the drawn ring holding portion (e.g., the width RW2 shown in FIG. 11) also decrease gradually toward the first leg portion 220.

Figure 27:
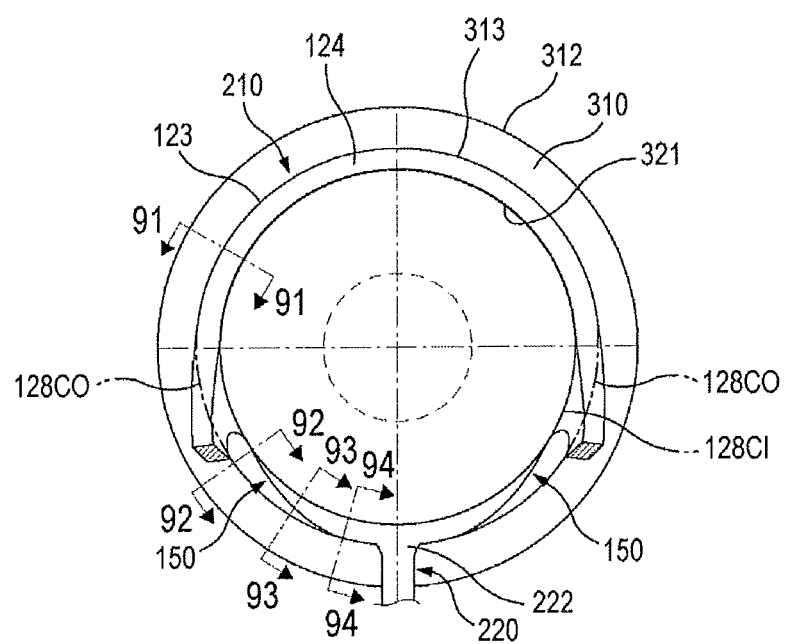
FIG. 27 schematically shows the drawing die, the drawing punch and the drawn head portion of the blank.

FIG. 27 schematically shows the drawing die, the drawing punch and the drawn head portion of the blank. FIGS. 28A to 28D show schematic sectional shapes taken along the lines 91-91, 92-92, 93-93 and 94-94 of FIG. 27, respectively.

Figure 28A:
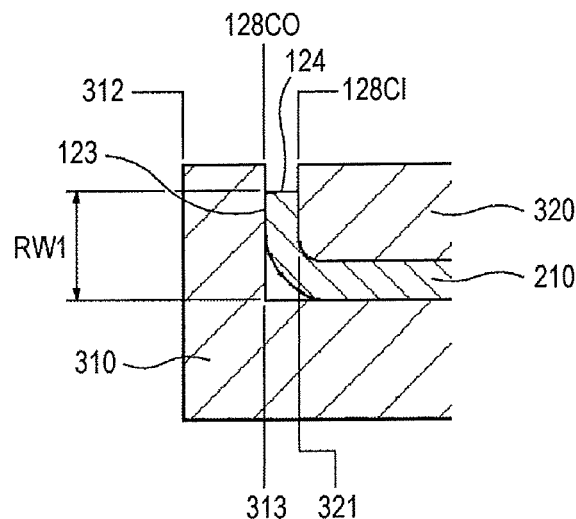
FIG. 28A shows a schematic sectional shape taken along the line 91-91 of FIG. 27.
Figure 28B:
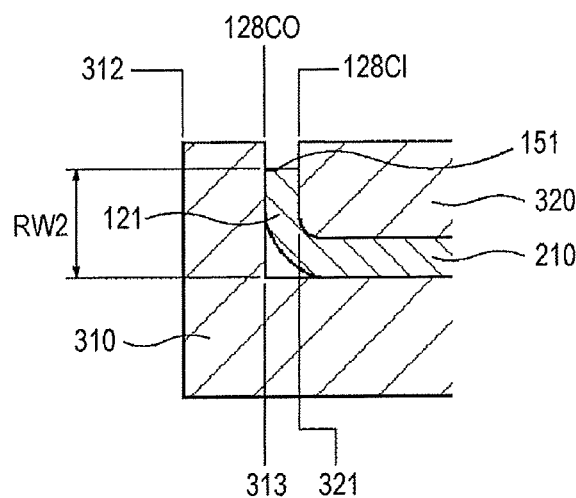
FIG. 28B shows a schematic sectional shape taken along the line 92-92 of FIG. 27.
Figure 28C:
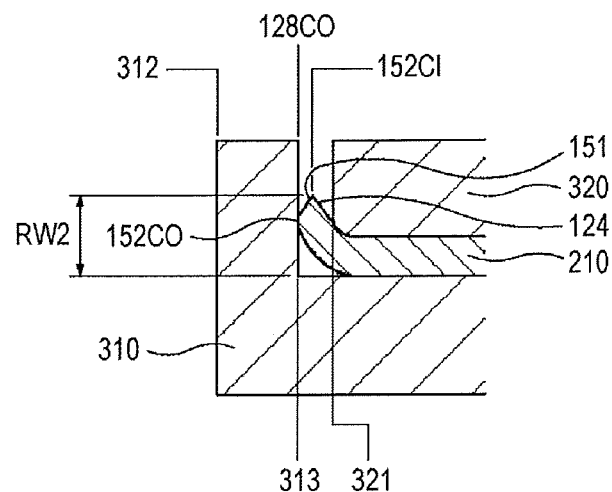
FIG. 28C shows a schematic sectional shape taken along the line 93-93 of FIG. 27.
Figure 28D:
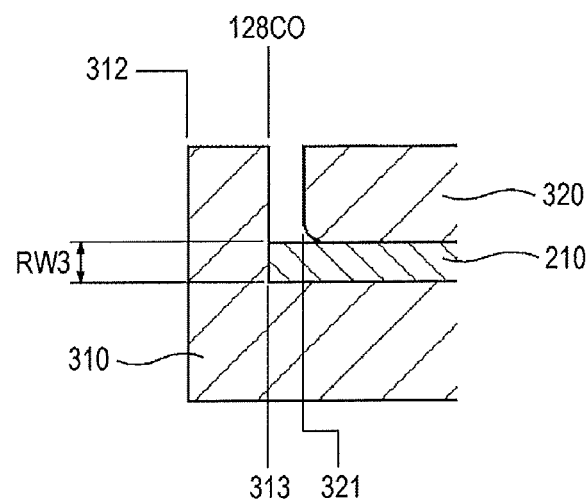
FIG. 28D shows a schematic sectional shape taken along the line 94-94 of FIG. 27.

As shown in FIGS. 28A and 28B, the drawing working of the head portion forms the outer peripheral portion 123 and the annular portion 124 of the ring holding portion. The first overlap portion decreases gradually toward the joint portion 222 of the first leg portion 220 between the outer peripheral contour of the first bending edge portion in the head portion and the inner periphery of the drawing die 310. Thus, as shown in FIG. 28C, the twisted surface 151 of the twisted portion is inclined at a predetermined angle with respect to the annular portion of the ring holding portion. As shown in FIG. 28D, a portion adjacent to the first leg portion 220 (i.e., a portion adjacent to the joint portion 222 of the first leg portion 220), in which the first overlap portion does not exist, are not drawn since it is not subject to the bending action during the drawing working. Therefore, as shown in FIG. 28D, in the vicinity of the joint portion 222 and the lower end of the twisted portion 150, the width RW3 of the ring holding portion 120 can be the same as the width of the head portion 210 before drawing. Accordingly, the fishing line guide according to one embodiment has the same width at both the lower end of the twisted portion 150 and the upper end of the first support leg portion.

As described above, in the head portion of the blank, the first overlap portion, which is between the contour of the first bending edge portion and the inner periphery 313 of the drawing die 310, decreases gradually toward the first leg portion 220 between the second leg portion 230 and the first leg portion 220. Therefore, as the head portion is drawn into the ring holding portion by drawing the head portion into the cylindrical shape, the outer peripheral surface of the first bending edge portion of the head portion is formed into the twisted portion 150. Moreover, in the ring holding portion 120, the twisted portion 150 forms both a portion of the outer peripheral portion 123 and a portion of the annular portion 124, and is twisted from the annular portion 124 to the outer peripheral portion 123.

Figure 29:
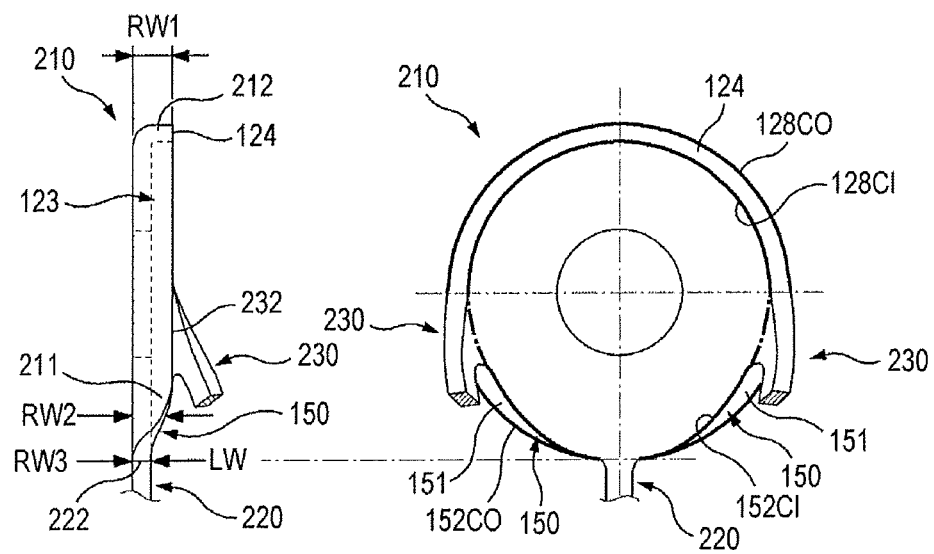
FIG. 29 shows side and rear views of the drawn head portion together.

FIG. 29 shows side and rear views of the drawn head portion together. While the head portion 210 of the blank is drawn into the ring holding portion, the twisted portion 150 is formed in the outer peripheral portion 123 and the annular portion 124 of the ring holding portion. The inner peripheral contour 152CI of the twisted portion 150 becomes a portion of the inner peripheral contour 128CI of the ring holding portion 120, while the outer peripheral contour 152CO of the twisted portion 150 becomes a portion of the outer peripheral contour 128CO of the ring holding portion 120. Further, the outer peripheral surface of the first bending edge portion of the head portion becomes the twisted surface 151 of the twisted portion 150.

While the head portion 210 of the blank is being worked into the ring holding portion, the bending cation is not applied to the joint portion 222 of the first leg portion 220. The first bending edge portion is bent without deformation of the joint portion 222 and forms the twisted portion 150. When the twisted portion 150 is formed, the joint portion 222 is not subjected to the elongation action which excessively elongates a metallic material. Accordingly, in the drawn ring holding portion, defects such as a crack are not formed in the joint portion of the first support leg portion.

Since the joint portion 222 of the first leg portion is not subjected to the bending action accompanied by the drawing working, the front end surface of the drawn head portion 210 and the surface of the joint portion 222 of the first leg portion 220 (the joint portion of the first support leg portion) are maintained as a non-curved flat surface, and no concave portion is formed between the ring holding portion and the first support leg portion. The ring holding portion is formed only through the drawing working on the head portion 210, and the first leg portion 220 is not subject to the bending action. After the ring holding portion is completed through the drawing working, the first leg portion 220 is bent forward with respect to the ring holding portion at a bending-starting point of the lower end of the joint portion 222. Thus, the first leg portion can be worked into the first support leg portion of the fishing line guide.

Referring to FIG. 29, the width RW1 of the ring holding portion 120 ranging between the upper end of the outer peripheral portion 123 and the lower end of the joint portion 232 of the second leg portion 230 (i.e., the minimum distance between the front and rear end surfaces the ring holding portion 120) is uniform. In the range ranging from the joint portion 232 of the second leg portion 230 to the joint portion 222 of the first leg portion 220, the width RW2 of the ring holding portion 120 (i.e., the minimum distance between the front and rear end surfaces of the ring holding portion 120) decreases gradually from the upper end of the twisted portion 150 toward the lower end of the twisted portion 150. And, both the width RW3 of the ring holding portion 120 at the lower end of the twisted portion 150 and the width LW at the upper end of the first leg portion 220 (or the first support leg portion) are the same.

The ring holding hole 121 shown in FIG. 5 is formed through the completed ring holding portion 120. The ring holding hole may be formed in the ring holding portion by punching the drawn head portion shown in FIG. 29 so that a hole smaller than the inner peripheral contour 128CI is formed through the head portion.

Figure 30:
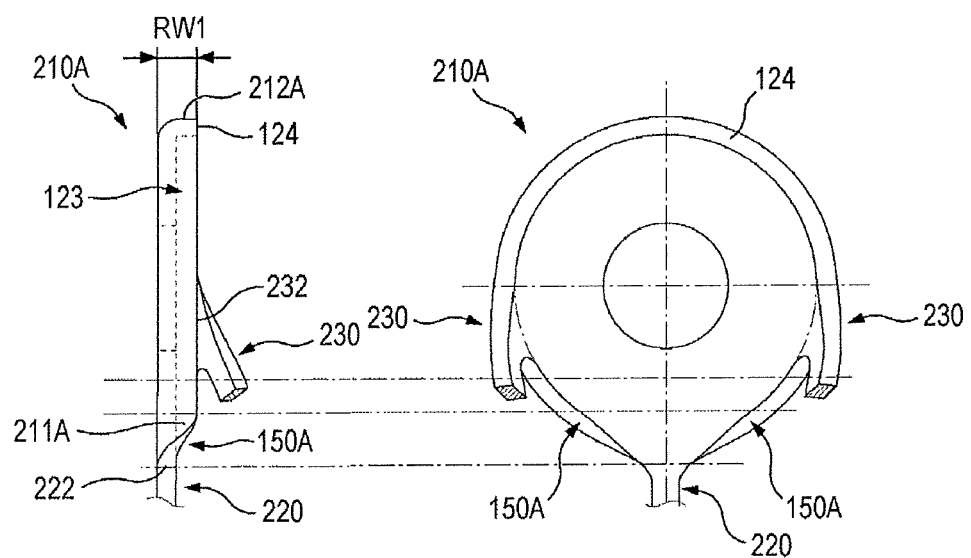
FIG. 30 shows side and rear views of a drawn head portion according to a further embodiment together.

FIG. 30 shows side and rear views of a drawn head portion according to another embodiment together. Referring to FIG. 30, a first bending edge portion 211A of a head portion 210A has a circumferential length shorter than the first bending edge portion 211 shown in FIG. 29, and a second bending edge portion 212A of the head portion 210A has a circumferential length longer than the second bending edge portion 212 shown in FIG. 29. When comparted to the foregoing embodiment, a twisted portion 150A has a shorter circumferential length, and a start point of the twisted portion 150A is spaced away from the joint portion 232 of the second leg portion 230 by a predetermined distance. Therefore, the range having the uniform width RW1 is increased in the ring holding portion, and the range of the curved surface 126 shown in FIG. 5 is enlarged. Accordingly, when the tangled fishing line escapes upward, the friction applied to the movement of the fishing line can be reduced more. In the embodiment shown in FIG. 30, the outer peripheral contour of the first bending edge portion 211A of the head portion 201A may form a curved line that has a curvature different from that of the outer peripheral contour of the ring holding portion. Thus, in the blank of the embodiment shown in FIG. 30, the contour located at the first bending edge portion 211A may form the same curvature as that of the contour of the ring holding portion. Further, the drawing die and the drawing punch for drawing the head portion 210A may be configured such that the first bending edge portion 211A is formed into the twisted portion 150A.

Figure 31:
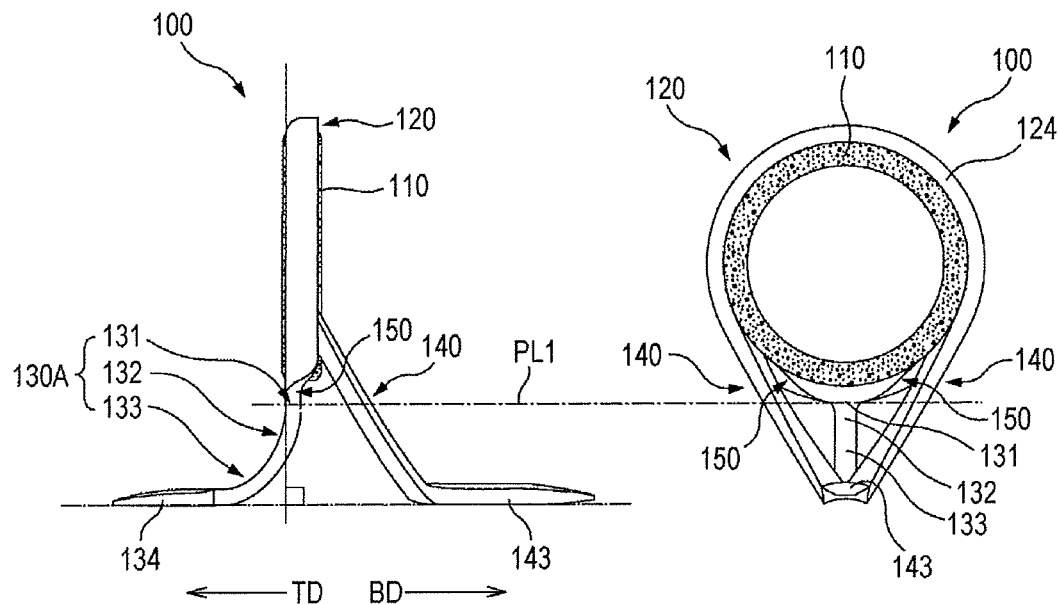
FIG. 31 shows side and rear views of a fishing line guide according to another embodiment together.

FIG. 31 shows side and rear views of a fishing line guide according to a further embodiment together. Referring to FIG. 31, the ring holding portion 120 of the fishing line guide 100 is positioned perpendicularly to the axial line of the rod body. For example, the ring holding portion 120 is positioned perpendicularly to a horizontal line extending through the first attachment foot 134 and the second attachment foot 143. The joint portion 131 of a first support leg portion 130A is not bent with respect to the ring holding portion 120. The curved portion 132 and the support portion 133 of the first support leg portion 130A are bent with respect to the joint portion 131 in the shape of a circular arc, and a clear bending-starting point between the joint portion 131 and the curved portion 132 hardly exists.

Figure 32:
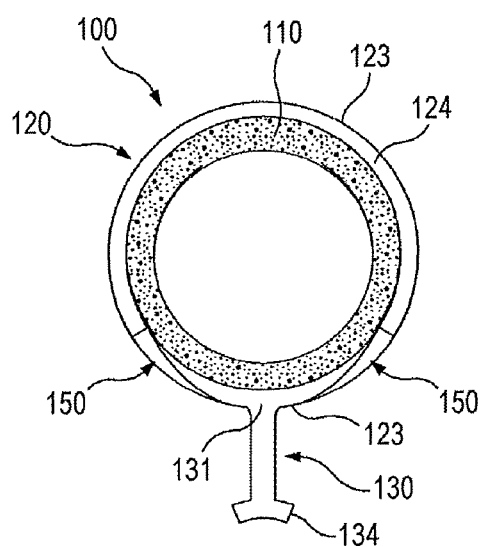
FIG. 32 is a rear view showing a fishing line guide having a single support leg portion.

The technical idea of the present disclosure also can be applied to a fishing ling guide having a single support leg portion. FIG. 32 is a rear view illustrating a fishing line guide having a single support leg portion. Referring to FIG. 32, the fishing line guide 100 has only the first support leg portion 130 that extends from the lower end of the ring holding portion 120. A pair of the twisted portions 150 extend upward from the first support leg portion 130 along the circumferential direction in opposing directions, respectively. The twisted portions 150 are twisted from the annular portion 124 to the outer peripheral portion 123 toward the first support leg portion 130.

In the fishing line guide according to one embodiment, a pair of twisted portions located adjacent to the first support leg portion are formed in the ring holding portion, and the first support leg portion is not subjected to the bending action which excessively elongates a metallic material during the drawing working for the ring holding portion. Therefore, the fishing line guide according to one embodiment has an enhanced bending proof stress.

Figures 33, 34:
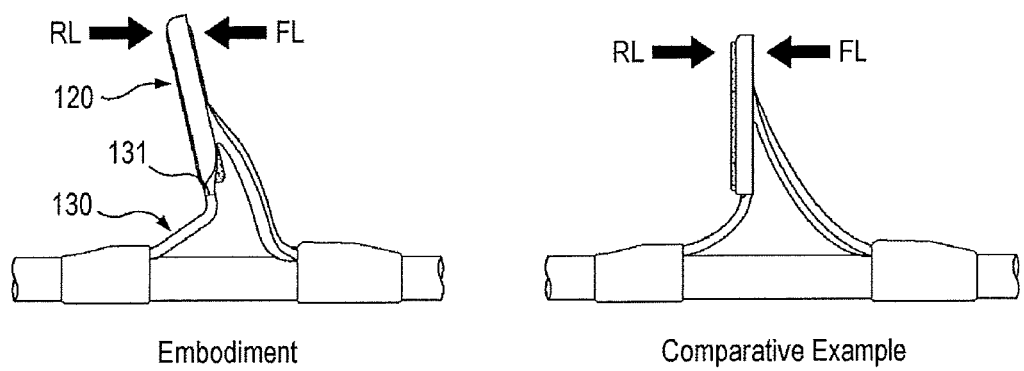
FIG. 33 illustrates a bending proof stress measurement test for an embodiment and a comparative example.
FIG. 34 is a table showing a result of a bending proof stress measurement test.

The enhanced bending proof stress of the fishing line guide according to one embodiment is described with reference to FIGS. 33 and 34. FIG. 33 shows an example where loads are applied in a proof stress measurement test which is conducted for measurement of bending proof stress. The fishing line guide of one embodiment shown in a left side of FIG. 33 may be the fishing line guide according to one of the foregoing embodiments. The fishing line guide of a comparative example shown in a right side of FIG. 33 may be, for example, the fishing line guide of a prior art shown in FIG. 1. To measure bending proof stress, a forward load FL and a rearward load RL may be applied to the ring holding portion in parallel to the rod body of the fishing rod.

FIG. 34 is a table showing a result of a bending proof stress measurement test shown in FIG. 33. In each test example, the fishing line guide of one embodiment and the fishing line guide of a comparative example have the ring holding portion and the first support leg portion which have the same size. The sizes of the fishing line guides become bigger from test example 1 toward test example 6. In each test example, when the forward load and the rearward load are applied to the ring holding portion, the load causing bending of 0.5 mm is measured as proof stress.

As seen from FIG. 34, the fishing line guides of one embodiment have an enhanced bending proof stress against the same forward and rearward loads in comparison with the fishing line guides of comparative examples. The reason why the fishing line guides of comparative examples have low proof stress is that the bending working excessively elongating a metallic material is done to the joint portion of the first support leg portion, and that such a joint portion buckles or cracks and the strength of the joint portion is reduced. However, in the fishing line guides of one embodiment, the drawing working is completed only in the range of the ring holding portion 120 and the first support leg portion 130 is not influenced by the drawing working. That is, although the ring holding portion 120 is subjected to the bending action accompanied by the drawing working, the joint portion 131 of the first support leg portion 130 is not subjected to the bending action. Thus, the joint portion 131 can maintain the original strength of a metallic material.

According to the present disclosure in some embodiments, the ring holding portion, which is drawn-worked so as to have a curved shape, can prevent the damage of the fishing line or the breakage of the guide ring. The fishing line guide according to some embodiments can exclude, from the ring holding portion and the support leg portion, the concave portion which causes the fishing line to be caught, and the crack which leads to breakage of the fishing line. The fishing line guide according to some embodiments can have enhanced bending proof stress and light weight.

Although the present disclosure has been described in relation to some embodiments, it should be noted that there may be various modifications and changes without departing from the scope of the present disclosure, which can be understood by those skilled in the art. In addition, such modifications and changes should be construed to belong to the scope of the claims appended herein.

What is claimed is:
1. A fishing line guide, comprising:
a ring holding portion including an inner peripheral portion, an outer peripheral portion and an annular portion extending in a circumferential direction of the ring holding portion between the inner peripheral portion and the outer peripheral portion, wherein the ring holding portion is coupled to a guide ring at the inner peripheral portion; and
a first support leg portion extending downward from the ring holding portion and having a pair of lateral surfaces connecting with the outer peripheral portion,
wherein the ring holding portion includes a pair of twisted portions which each form a portion of the outer peripheral portion and a portion of the annular portion and which are twisted respectively from the annular portion to the outer peripheral portion toward the pair of lateral surfaces of the first support leg portion,
wherein the first support leg portion includes a joint portion at which the first support leg portion connects with the outer peripheral portion of the ring holding portion,
wherein, when the fishing line guide is viewed from a lateral side of the fishing line guide, a lower end of each of the twisted portions is positioned at the joint portion, and
wherein, when the fishing line guide is viewed from the lateral side of the fishing line guide, each of the twisted portions has a width gradually increasing from an upper end of each of the twisted portions toward the respective lower end of each of the twisted portions.

2. The fishing line guide of claim 1, wherein, when the fishing line guide is viewed from the lateral side of the fishing line guide, the ring holding portion has a width gradually decreasing from the upper end of each of the twisted portions toward the respective lower end of each of the twisted portions.

3. The fishing line guide of claim 1, wherein, when the fishing line guide is viewed from the lateral side of the fishing line guide, the ring holding portion has a width at the lower end of each of the twisted portions that is the same as a width at an upper end of the first support leg portion.

4. The fishing line guide of claim 1, wherein the first support leg portion includes a curved portion which is bent with respect to the ring holding portion and extends from the joint portion, and wherein, when the fishing line guide is viewed from the lateral side of the fishing line guide, a front contour of the curved portion lies on or is located further forward than a front contour of the ring holding portion.

5. The fishing line guide of claim 1, wherein each of the pair of the twisted portions includes:
    a twisted surface extending while being twisted toward a respective one of the pair of lateral surfaces of the first support leg portion;
    an outer peripheral contour at which the outer peripheral portion meets with the twisted surface; and
    an inner peripheral contour at which the annular portion meets with the twisted surface, and
wherein the twisted surface includes:
    a first surface forming the portion of the annular portion and adjoining the outer peripheral portion through the outer peripheral contour;
    a second surface which is continuous from the first surface in the circumferential direction of the ring holding portion and adjoins the outer peripheral portion and the annular portion respectively through the outer peripheral contour and the inner peripheral contour and is twisted about the respective one of the pair of the lateral surfaces of the first support leg portion; and
    a third surface which is continuous from the second surface in the circumferential direction of the ring holding portion and adjoins the annular portion through the inner peripheral contour and forms the portion of the outer peripheral portion.

6. The fishing line guide of claim 5, wherein, when the fishing line guide is viewed from the lateral side of the fishing line guide, the outer peripheral contour is continuous with a front contour of the first support leg portion and the inner peripheral contour is continuous with a rear contour of the first support leg portion.

7. The fishing line guide of claim 1, further comprising a pair of second support leg portions which each extend from the annular portion of the ring holding portion respectively,
    wherein the pair of twisted portions are each located respectively between the joint portion at which the first support leg portion connects with the outer peripheral portion and joint portions at which the pair of second support leg portions connect with the annular portion.

8. The fishing line guide of claim 1, wherein the outer peripheral portion has a curved surface which extends along the inner peripheral portion in the circumferential direction of the ring holding portion and is curved with respect to the inner peripheral portion, and
    wherein, when the fishing line guide is attached to a rod body of a fishing rod, the curved surface faces toward a tip of the fishing rod.

9. A fishing rod, comprising:
    a rod body; and
    the fishing line guide of claim 1,
    wherein the fishing line guide is attached to the rod body.

* * * * *